US012607532B2

(12) United States Patent
O'Mahony

(10) Patent No.:  US 12,607,532 B2
(45) Date of Patent:  Apr. 21, 2026

(54) ADJUSTABLE INDICATOR FOR PRESSURE GAUGES

(71) Applicant: Core Precision, LLC, Murrysville, PA (US)

(72) Inventor: Patrick G. O'Mahony, Murrysville, PA (US)

(73) Assignee: Core Precision, LLC, Murrysville, PA (US)

( * ) Notice: Subject to any disclaimer, the term of this patent is extended or adjusted under 35 U.S.C. 154(b) by 351 days.

(21) Appl. No.: 18/343,278

(22) Filed: Jun. 28, 2023

(65) Prior Publication Data

US 2024/0003769 A1      Jan. 4, 2024

Related U.S. Application Data

(60) Provisional application No. 63/356,633, filed on Jun. 29, 2022.

(51) Int. Cl.
| | |
|---|---|
| *G01L 19/14* | (2006.01) |
| *G01L 7/00* | (2006.01) |
| *G01L 7/04* | (2006.01) |
| *G01L 19/10* | (2006.01) |

(52) U.S. Cl.
CPC ............ G01L 19/143 (2013.01); G01L 7/041 (2013.01); G01L 19/10 (2013.01)

(58) Field of Classification Search
CPC . G01L 19/147; G01L 9/0072; G01L 19/0645; G01L 19/0084; G01L 13/025; G01L 19/0007; G01L 9/0042; G01L 19/0038; G01L 9/0073; G01L 9/0075; G01L 9/0054; G01L 9/0055; G01L 19/04; G01L 7/00; G01L 7/04; G01L 19/148; G01L 19/14; G01L 19/143; G01L 17/00; G01L 7/18; G01L 19/0092; G01L 15/00; G01L 9/0051; G01L 7/041; G01L 9/12; G01L 9/065; G01L 19/0618; G01L 9/0052; G01L 9/125; G01L 7/16; G01L 19/0609; G01L 19/003; G01L 9/007;

(Continued)

(56) References Cited

U.S. PATENT DOCUMENTS

| | | | | |
|---|---|---|---|---|
| 3,276,260 A | | 10/1966 | Weiler | |
| 3,950,998 A | * | 4/1976 | Murphy, Jr. | ........ G01L 19/0618 |
| | | | | 73/714 |

(Continued)

FOREIGN PATENT DOCUMENTS

| | | |
|---|---|---|
| CN | 202757731 U | 2/2013 |
| CN | 210513504 U | 5/2020 |
| JP | 6120784 B2 | 4/2017 |

OTHER PUBLICATIONS

Differential Pressure Gauge along Share with Calibration Certificate (Measuring Range: 0 to 100 Pascals); https://www.amazon.in/ Differential-Pressure-Calibration-Certificate-Measuring/dp/ B071FSVY95.
Pressure Gauge For Clean Regulator / With Limit Indicator G46-SRA/B Series (SMC); https://us.misumi-ec.com/vona2/detail/ 221006298943/.

*Primary Examiner* — Andre J Allen

(74) *Attorney, Agent, or Firm* — K&L Gates LLP

(57) ABSTRACT

Disclosed is a device that includes a housing attachable to a pressure gauge, and a pressure indicator manually pivotable within the housing to a set position. The housing is configured to enclose and retain the pressure indicator in the set position.

19 Claims, 17 Drawing Sheets

(58) Field of Classification Search

CPC ............. G01L 19/0627; G01L 19/0046; G01L 9/0022; G01L 9/06; G01L 19/0636; G01L 7/084; G01L 13/02; G01L 19/0023; G01L 19/142; G01L 7/043; G01L 19/08; G01L 9/0002; G01L 19/02; G01L 9/008; G01L 19/141; G01L 9/006; G01L 11/02; G01L 19/0672; G01L 23/10; G01L 23/18; G01L 19/0681; G01L 9/0077; G01L 19/12; G01L 27/005; G01L 7/082; G01L 9/0044; G01L 19/0015; G01L 19/0069; G01L 7/063; G01L 9/0001; G01L 19/146; G01L 21/12; G01L 27/002; G01L 27/007; G01L 9/16; G01L 11/00; G01L 19/00; G01L 9/0026; G01L 9/0089; G01L 9/045; G01L 9/14; G01L 19/0654; G01L 1/2281; G01L 11/025; G01L 13/026; G01L 11/008; G01L 7/22; G01L 13/00; G01L 9/0047; G01L 7/08; G01L 9/0076; G01L 9/0025; G01L 9/0035; G01L 19/0061; G01L 9/0005; G01L 9/0041; G01L 9/0019; G01L 9/08; G01L 9/10; G01L 21/00; G01L 9/04; G01L 11/006; G01L 19/086; G01L 9/00; G01L 9/0008; G01L 1/18; G01L 11/004; G01L 19/069; G01L 9/0057; G01L 19/083; G01L 19/06; G01L 19/10; G01L 19/16; G01L 9/0016; G01L 13/023; G01L 7/048; G01L 9/0048; G01L 9/0027; G01L 9/0086; G01L 9/0079; G01L 11/04; G01L 1/20; G01L 9/0091; G01L 27/00; G01L 11/002; G01L 23/24; G01L 7/182; G01L 1/02; G01L 19/0663; G01L 7/166; G01L 23/22; G01L 9/0036; G01L 9/0061; G01L 9/0039; G01L 23/125; G01L 19/145; G01L 9/0013; G01L 21/04; G01L 9/0045; G01L 9/0092; G01L 1/142; G01L 7/104; G01L 9/0033; G01L 9/0083; G01L 9/0098; G01L 1/2293; G01L 7/24; G01L 9/02; G01L 21/22; G01L 9/0029; G01L 7/022; G01L 1/205; G01L 9/0064; G01L 23/08; G01L 5/14; G01L 13/06; G01L 23/16; G01L 7/088; G01L 7/163; G01L 9/0007; G01L 23/222; G01L 1/16; G01L 1/2287; G01L 9/0085; G01L 9/025; G01L 1/2212; G01L 21/14; G01L 9/0004; G01L 23/02; G01L 9/003; G01L 9/085; G01L 1/14; G01L 1/148; G01L 9/0058; G01L 9/105; G01L 7/02; G01L 7/061; G01L 9/002; G01L 1/2231; G01L 13/028; G01L 9/0095; G01L 23/28; G01L 1/162; G01L 19/0076; G01L 7/12; G01L 9/0038; G01L 9/0032; G01L 21/10; G01L 7/024; G01L 19/149; G01L 1/246; G01L 7/086; G01L 1/005; G01L 5/228; G01L 7/06; G01L 1/2206; G01L 7/102; G01L 13/021; G01L 27/02; G01L 1/2262; G01L 1/24; G01L 1/26; G01L 23/00; G01L 9/0094; G01L 19/144; G01L 9/0082; G01L 1/125; G01L 9/0097; G01L 1/2268; G01L 11/06; G01L 21/30; G01L 21/34; G01L 23/221; G01L 7/187; G01L 7/20; G01L 1/146; G01L 23/26; G01L 7/068; G01L 1/144; G01L 1/225; G01L 23/32; G01L 7/14; G01L 1/165; G01L 23/12; G01L 1/241; G01L 13/04; G01L 7/045; G01L 1/086; G01L 1/22; G01L 7/108; G01L 9/18; G01L 1/127; G01L 17/005; G01L 5/18; G01L 1/245; G01L 21/32; G01L 1/183; G01L 1/2218; G01L 9/0023; G01L 1/243; G01L 23/145; G01L 5/0047; G01L 5/0076; G01L 9/0088; G01L 1/106; G01L 1/10; G01L 9/001; G01L 1/186; G01L 23/223; G01L 25/00; G01L 5/165; G01L 5/226; G01L 9/0017; G01L 1/044; G01L 3/245; G01L 9/005; G01L 1/08; G01L 21/16; G01L 3/1485; G01L 5/0038; G01L 5/162; G01L 5/225; G01L 7/026; G01L 7/065; G01L 9/0014; G01L 1/04; G01L 1/242; G01L 21/24; G01L 3/10; G01L 5/0004; G01L 5/0052; G01L 5/24; G01L 7/10; G01L 1/00; G01L 1/103; G01L 1/2275; G01L 1/247; G01L 21/02; G01L 21/26; G01L 23/225; G01L 3/102; G01L 3/105; G01L 5/223; G01L 7/028; G01L 9/0011; G01L 5/00; G01L 5/0028; G01L 5/243; G01L 1/083; G01L 1/12; G01L 21/36; G01L 23/04; G01L 23/14; G01L 23/30; G01L 3/103; G01L 5/0033; G01L 5/102; G01L 5/133; G01L 5/1627; G01L 5/166; G01L 7/185; G01L 1/255; G01L 21/08; G01L 5/0057; G01L 5/22; G01L 1/042; G01L 1/122; G01L 1/2225; G01L 1/2243; G01L 1/2256; G01L 1/248; G01L 2009/0067; G01L 2009/0069; G01L 21/06; G01L 23/06; G01L 3/00; G01L 3/06; G01L 3/1478; G01L 3/1492; G01L 3/18; G01L 3/24; G01L 3/242; G01L 5/0061; G01L 5/08; G01L 5/10; G01L 5/101; G01L 5/108; G01L 5/16; G01L 5/161; G01L 5/167; G01L 5/28; G01L 1/046; G01L 2009/0066; G01L 2019/0053; G01L 23/085; G01L 23/20; G01L 5/0071; G01L 5/008; G01L 5/06; G01L 5/171; G01L 7/106

USPC .................................................. 73/700–756

See application file for complete search history.

(56) References Cited

U.S. PATENT DOCUMENTS

| | | | | |
|---|---|---|---|---|
| 4,020,787 | A * | 5/1977 | Castro ...................... | G09F 7/00 |
| | | | | 116/300 |
| 4,055,141 | A | 10/1977 | Homs | |
| 4,092,948 | A | 6/1978 | Bray | |
| 4,825,699 | A * | 5/1989 | Der-Ming .............. | G01L 7/048 |
| | | | | 73/740 |
| 5,765,501 | A | 6/1998 | Tung et al. | |
| 6,718,907 | B2 * | 4/2004 | Kao ...................... | G12B 11/02 |
| | | | | 24/546 |
| 8,978,463 | B2 * | 3/2015 | Yamauchi .............. | G01L 19/10 |
| | | | | 73/296 |
| 9,134,192 | B2 | 9/2015 | Yamauchi | |
| 2004/0020302 | A1 * | 2/2004 | Okitsu .................... | G01L 19/16 |
| | | | | 73/711 |
| 2011/0203382 | A1 | 8/2011 | Kim et al. | |

* cited by examiner

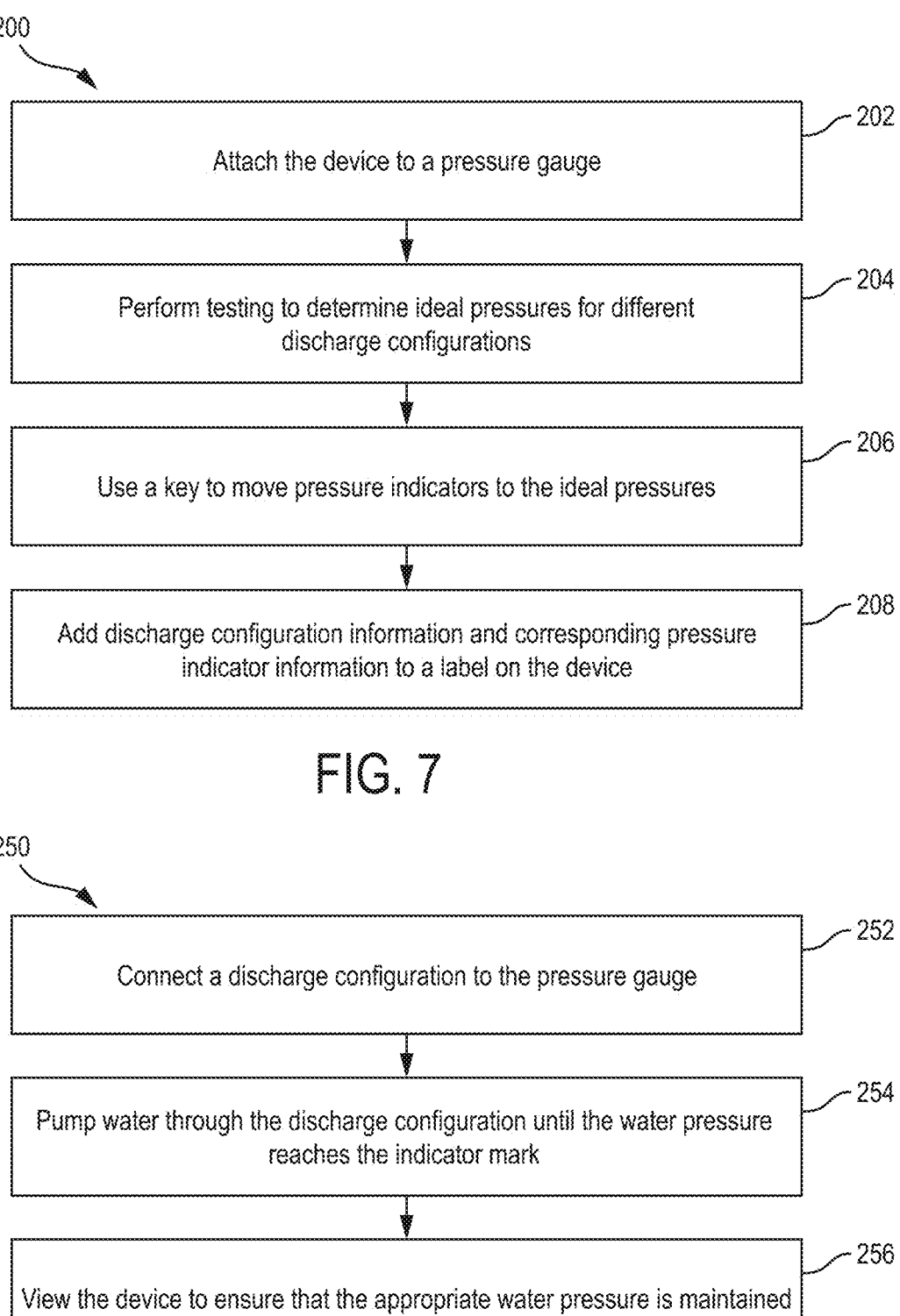

200

202 Attach the device to a pressure gauge

204 Perform testing to determine ideal pressures for different discharge configurations 206 Use a key to move pressure indicators to the ideal pressures 208 Add discharge configuration information and corresponding pressure indicator information to a label on the device

252 Connect a discharge configuration to the pressure gauge

254 Pump water through the discharge configuration until the water pressure reaches the indicator mark 256 View the device to ensure that the appropriate water pressure is maintained

FIG. 8

ADJUSTABLE INDICATOR FOR PRESSURE GAUGES

CROSS-REFERENCE TO RELATED APPLICATIONS

The present application claims the benefit of priority under 35 U.S.C. § 119(e) to U.S. Provisional Application No. 63/356,633, entitled "ADJUSTABLE INDICATOR FOR PRESSURE GAUGES", filed on Jun. 29, 2022, which is incorporated by reference herein in its respective entirety.

BACKGROUND

The present disclosure relates to a device that allows an operator to view current pressure and desired pressure on a pressure gauge. Certain gauges include an additional needle for indicating measured maximum or minimum pressures. Such gauges often require manual resetting of the indicator needle each time the gauge is used. These gauges can also be inadvertently manipulated and may not provide a consistent indicating mark.

SUMMARY

In one general aspect, the present disclosure provides a device, comprising a housing attachable to a pressure gauge, and a pressure indicator manually pivotable within the housing to a set position. The housing is configured to enclose and retain the pressure indicator in the set position.

In another aspect, the present disclosure provides a system for indicating a pressure on a pressure gauge, the system comprising a housing releasably attachable to the pressure gauge, wherein the housing comprises a transparent front cover, and a pressure indicator manually pivotable within the housing to a set position, wherein the housing is configured to enclose and retain the pressure indicator in the set position. The system further comprises an adjuster drivingly coupled to the pressure indicator, and a tool configured to selectively mate with the adjuster to manually pivot the pressure indicator within the housing to the set position.

In another aspect, the present disclosure provides a device, comprising a housing attachable to a fire truck pressure gauge, wherein the housing comprises a transparent front cover. The device further comprises a first pressure indicator manually pivotable within the housing to a first position, and a second pressure indicator manually pivotable inside of the housing to a second position. The second pressure indicator is offset laterally from the first pressure indicator. The housing is configured to enclose and retain the first pressure indicator in the first position and the second pressure indicator in the second position. The device further comprises a first adjuster drivingly coupled to the first pressure indicator, a second adjuster drivingly coupled to the second pressure indicator; a lock configured to hold the first pressure indicator in the first position and the second pressure indicator in the second position, and an implement configured to selectively overcome the lock to pivot the first pressure indicator within the housing to a first set position and to pivot the second pressure indicator within the housing to a second set position.

BRIEF DESCRIPTION OF THE FIGURES

The novel features of the various aspects are set forth with particularity in the appended claims. The described aspects, however, both as to organization and methods of operation, may be best understood by reference to the following description, taken in conjunction with the accompanying drawings in which:

FIG. 7 is a calibration diagram for the device of FIG. 2, according to at least one aspect of the present disclosure.

FIG. 8 is a use diagram for the device of FIG. 2, according to at least one aspect of the present disclosure.

Figure 1:
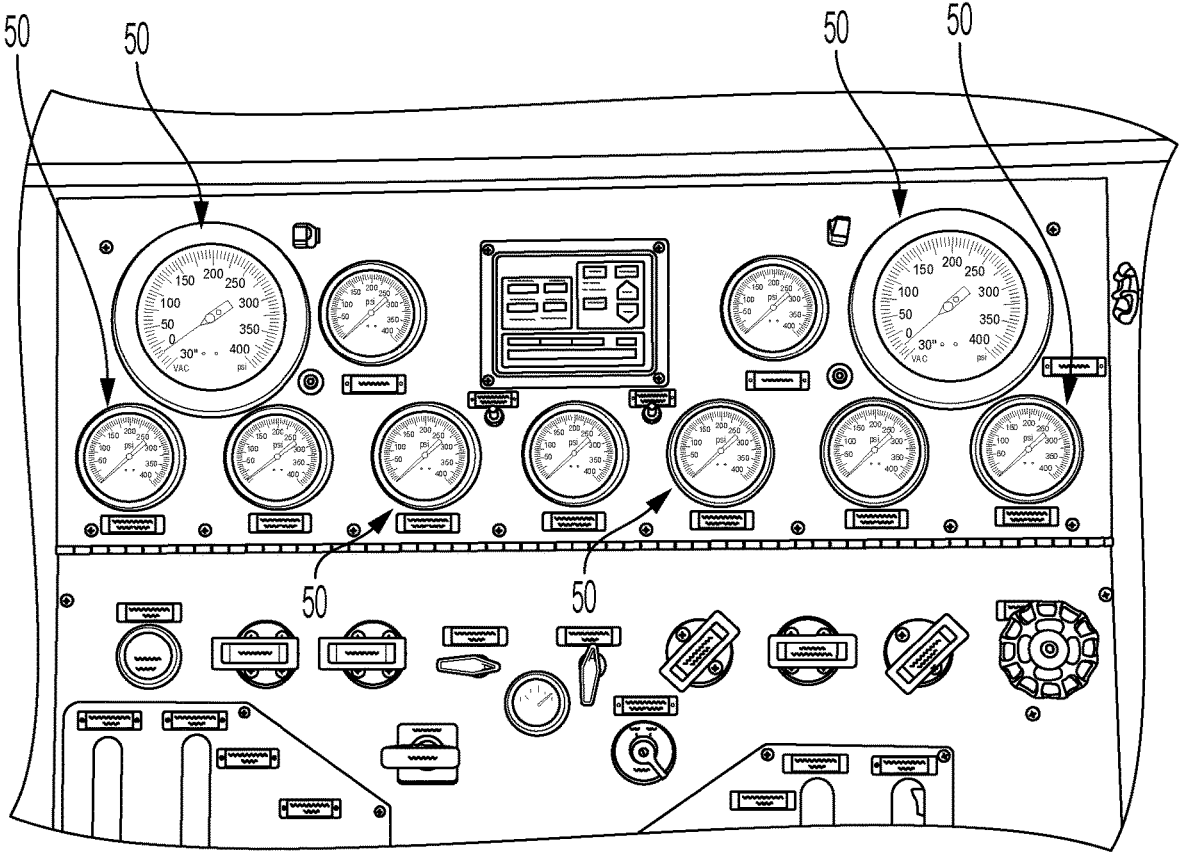
FIG. 1 is a plan view of a control panel, or pump panel, for a fire truck, where the control panel includes multiple pressure gauges for displaying discharge water pressure, according to at least one aspect of the present disclosure.

The accompanying drawings are not intended to be drawn to scale. Corresponding reference characters indicate corresponding parts throughout the several views. For purposes of clarity, not every component may be labeled in every drawing. The exemplifications set out herein illustrate certain embodiments of the invention, in one form, and such exemplifications are not to be construed as limiting the scope of the invention in any manner.

DESCRIPTION

In certain instances an ideal pump discharge pressure should be maintained and issues arise if the pressure fluctuates from the ideal pressure. For example, a discharge pressure from a hose line of a fire truck should be monitored to ensure water can reach the desired location at the desired flow rate. The ideal pressure can be situation specific depending on, for example, the water source and the number and type of hoses coupled to the water source. A device for indicating one or more pressures on a gauge, holding the indicators in place against the forces of friction and/or vibrations, and unlocking the indicators to allow intentional adjustments to the indicated pressures would be helpful. The device can be both lockable and adjustable with the use of a key, for example. In various aspects, upon installing the device and testing the setup, the indicator can be adjusted to one or more ideal pressure thresholds and/or ranges. In many instances, the device can be set and left alone for long periods of time until new hoses and/or hose configurations are installed, i.e. a "set and forget device."

The present disclosure provides a device and calibration method that can overlay an ideal pressure on a pressure gauge. The device can fit in front of the glass on the pressure gauge and can include multiple, different colored indicators. The indicator can fit close to the glass of the pressure gauge. In certain instances, the indicator can affix to flush mounted gauges with self-adhesive tape, for example. In other instances, the indicator can be secured under the screw holding the front bezel of surface-mount gauges. The device can include a housing that attaches to a pressure gauge and one or more pressure indicators that manually pivot within the housing to a set position. A key can be used to move an indicator to a set position that corresponds to a desired pressure on the gauge face. The housing can be configured to enclose and retain the pressure indicator in the set position. After the device is attached to a pressure gauge, a calibration process can be performed to determine an ideal pressure for a specific circumstance and/or hose setup. Once the ideal pressure has been identified for the particular circumstance/hose setup, a key can be used to set a pressure indicator to point to an ideal pressure or pressure range on the pressure gauge. Then, the pressure indicator and the circumstance/hose setup can be labeled on the device. The label can inform the operator of a particular pressure or pressure range that is desired. The calibration process and setting of a pressure indicator can be performed for each pressure indicator when the device includes multiple pressure indicators, for example. This can allow multiple pressures for different circumstances to be overlaid on the pressure gauge at the same time.

In various instances, referring to FIG. 1, the indicator device can be used on fire truck pressure gauges 50 to aid fire truck operators in consistently achieving pre-defined discharge flow rates across several pump discharges. The device could be mounted to individual fire truck pump discharge gauges 50 to indicate one or more ideal or maximum pumping pressures. The indicator set point can be generated by testing or calculating pressure/flow rates based on pump discharge pressure and equipment downstream of the pump, such as the length of the connected hose, nozzle type, etc. Then, a key, or tool, can be used to align the indicator with the corresponding pressure on the gauge face. The circumstance relating to the indicator could be displayed on a label of the device. The key can be required to adjust the indicator points so that the indicator points are not moved inadvertently or accidentally.

The pressure gauge attachment device could be used with any pneumatic, hydraulic, or other industrial gauge where an indicating point for reading pressures would aid in the consistent operation of the equipment. A benefit of the device is that it can be retrofit onto existing pressure gauges. For example, existing fire trucks having pressure gauges can be retrofit with one or more indicator devices to improve the operator experience, reduce the cognitive burden on operators during emergency situations, and/or reduce incidences of operator error without requiring an updated control panel and/or fire truck controls.

The indicator device can allow an operator to manipulate the indicators to a set position with a key and can maintain the indicators in their set positions, for example. In such instances, the indicator(s) will not move due to vibration of the device and can require a key to move or adjusting the ideal pressure(s)/pressure range(s). A key requirement can also ensure the pressure indicator is not accidentally or inadvertently bumped and/or moved.

The device can also allow for multiple output/hose configurations and indicator pairs displayed on the device. This can allow an operator to view multiple ideal pressures and the configuration or circumstance to which each ideal pressure corresponds.

Figure 4:
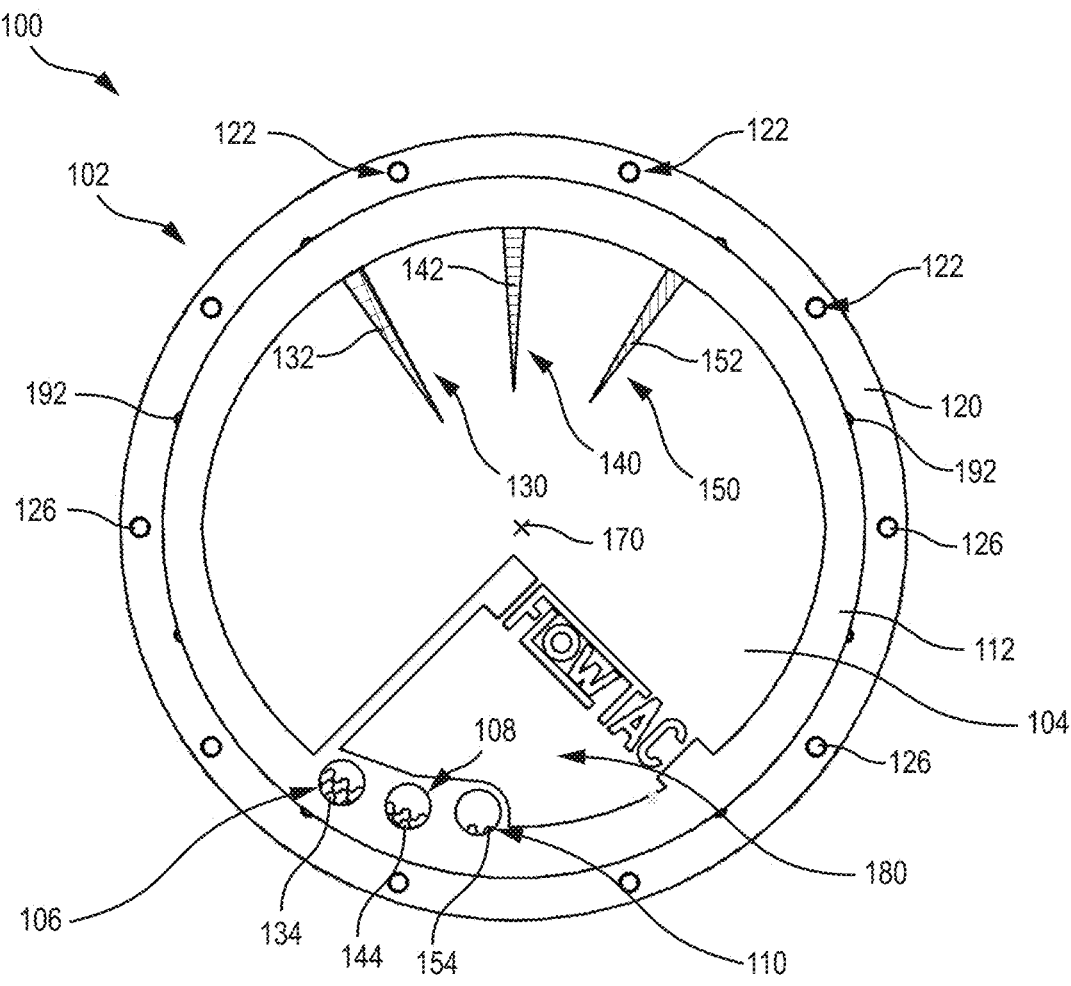
FIG. 4 is a front view of the device of FIG. 2, according to at least one aspect of the present disclosure.
Figure 5:
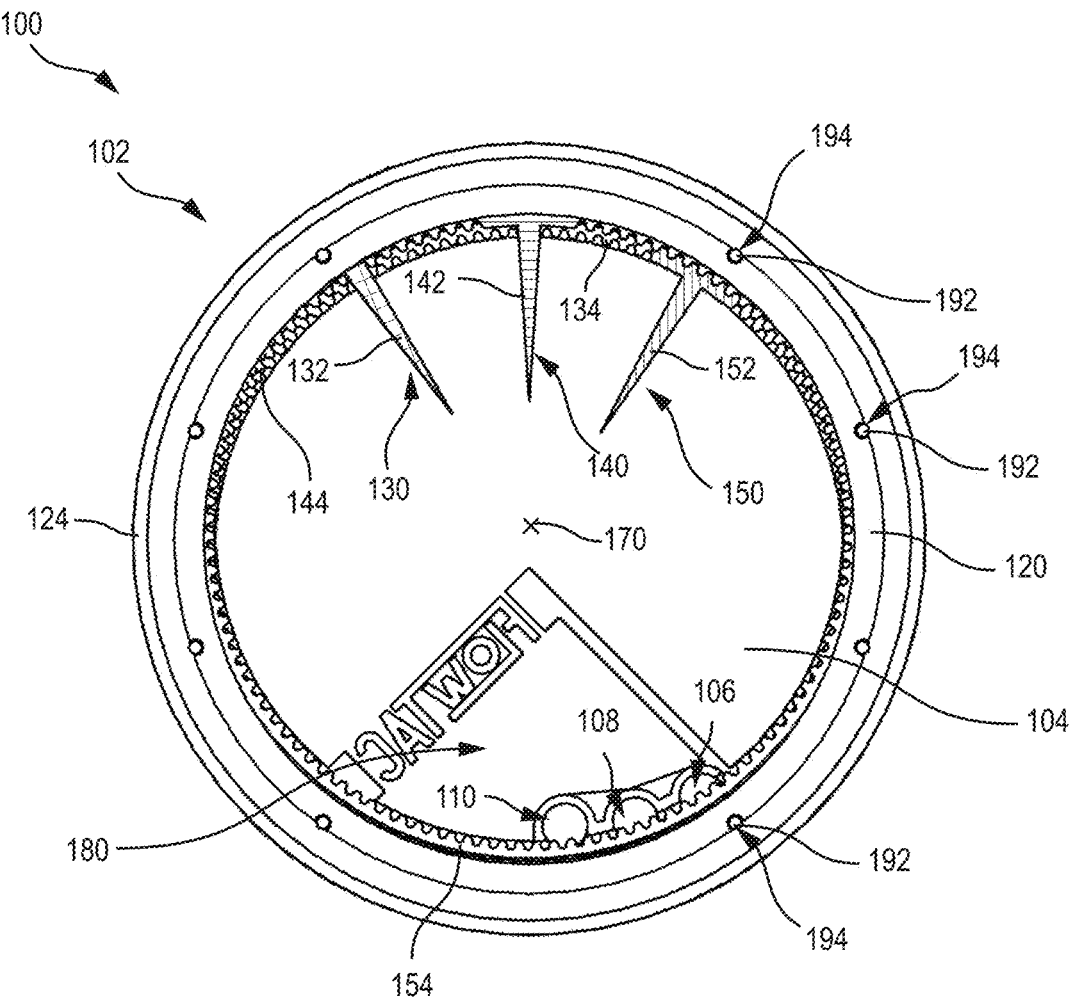
FIG. 5 is a back view of the device of FIG. 2, according to at least one aspect of the present disclosure.
Figure 6:
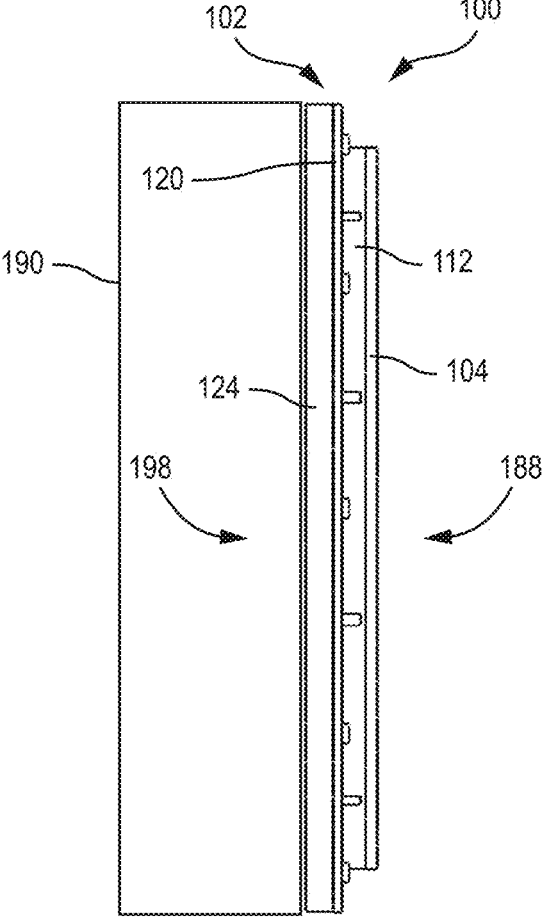
FIG. 6 is a side view of the device of FIG. 2, according to at least one aspect of the present disclosure.

FIGS. 2-6 illustrate a device 100 that attaches to a pressure gauge to overlay ideal pressures on a pressure gauge 190 (FIG. 6). The device 100 includes pressure indicators 130, 140, and 150 for identifying ideal pressures on the pressure gauge 190. Example pressure gauges are shown in FIG. 1, for example. The device 100 can be attached to the pressure gauge 190 at a back bezel 120 of the device 100 using an adhesive. In some instances, it is beneficial to use a mounting ring 124, which can be positioned between the glass of the pressure gauge 190 and the back bezel 120 of the device 100. For example, it can be beneficial to use the mounting ring 124 when the pressure gauge 190 is curved and requires an offset from the glass of the pressure gauge 190 for the device 100 to be able to attach and seal to the pressure gauge 190 glass. The mounting ring 124 can include alignment holes 122 which correspond to alignment pins 126 on the back bezel 120 (see FIG. 3). The alignment pins 126 can be inserted into the corresponding alignment holes 122 to align and connect the mounting ring 124 to the back bezel 120.

The mounting ring 124 can be attached to the pressure gauge 190 with an adhesive. Additionally or alternatively, the back bezel 120 could be mounted to the pressure gauge 190 with screws or other fasteners being inserted into the pressure gauge 190 and/or glass thereof. For example, the screw(s) that hold the glass over the pressure gauge 190 could be used to also secure the back bezel 120 of the device 100 to the pressure gauge 190.

Figure 2:
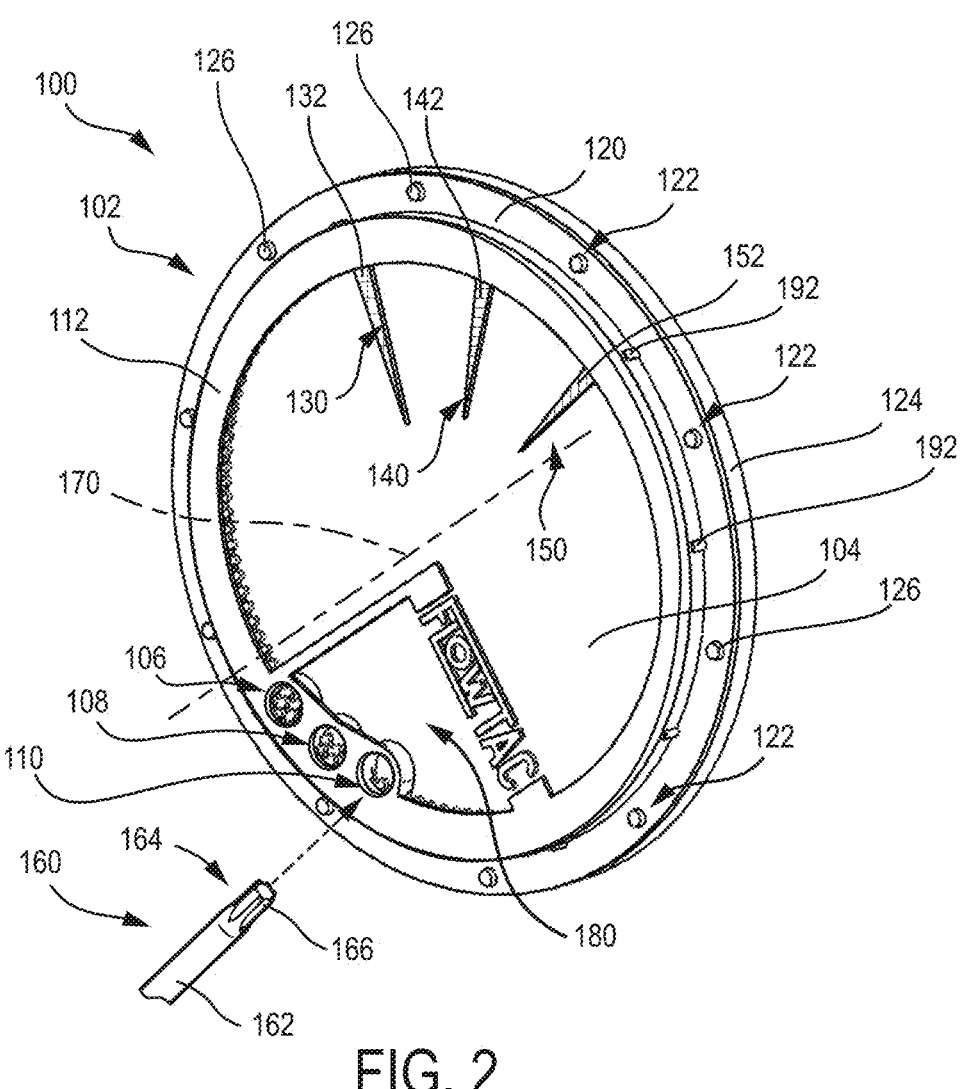
FIG. 2 is a perspective view of a device attachable to a pressure gauge and a tool for adjusting the device, according to at least one aspect of the present disclosure.
Figure 2A:
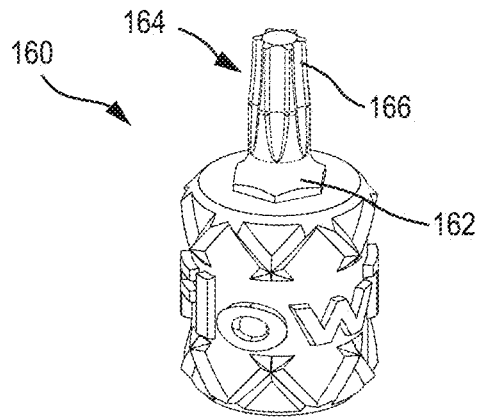
FIG. 2A is a perspective view of an example key to adjust pressure indicators of the device of FIG. 2, according to at least one aspect of the present disclosure.

Referring to FIG. 6, the device 100 is attached to the pressure gauge 190 at the back side 198 of the device 100. A user looks through the front side 188 of the device 100 to see the values on the pressure gauge 190. The user can then use a key, or tool, 160 (FIG. 2, 2A) to rotate pressure indicator 130, 140, or 150 into alignment with a specific pressure on the pressure gauge 190.

Figure 3:
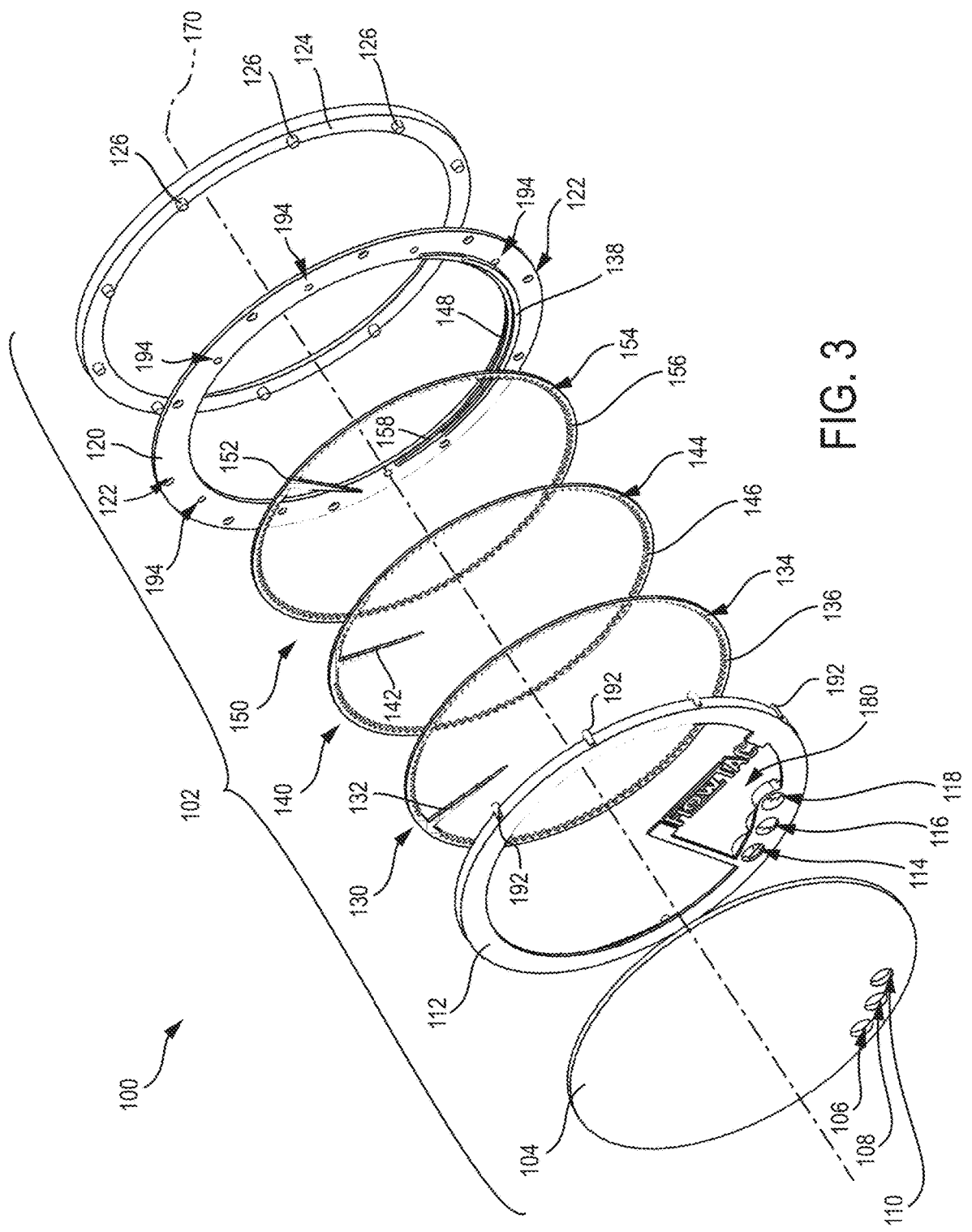
FIG. 3 is an exploded perspective view of the device of FIG. 2, according to at least one aspect of the present disclosure.

The device 100 has a housing 102 that encloses and retains the pressure indicators 130, 140, and 150. The reader will readily appreciate that there could be more or less than three pressure indicators retained in the housing 102. For example, a single pressure indicator can be used. Additionally or alternatively, one or more of the pressure indicators can identify a pressure range. In certain instances, one or more of the indicators can identify a single pressure and one or more of the indicators can identify a pressure range. The housing 102 includes a lens 104, or transparent front cover, a front bezel 112, along with the back bezel 120. Referring primarily to FIG. 3, the lens 104 is attached to the front bezel 112 and the front bezel 112 is attached to the back bezel 120. The pressure indicators 130, 140, and 150 are "sandwiched" or otherwise held and retained therebetween. In one aspect, the lens 104 can be attached to the front bezel 112 with an adhesive. As shown in FIG. 3, the front bezel 112 has alignment pins 192, or rods, that are inserted into alignment holes 194 in the back bezel 120 to align and attach the front bezel 112 to the back bezel 120. In one aspect, the front bezel 112 can attach to the back bezel 120 by an adhesive. In an alternative aspect, the front bezel 112 and the back bezel 120 could be attached with screws and/or friction fit connections between the pins and holes. In certain instances, the bezels 112, 120 can be snap-fit together to form the housing 102 around the pressure indicators 130, 140, 150.

When the device 100 is assembled, the pressure indicators 130, 140, and 150 are located inside of the housing 102 behind the lens 104. The pressure indicators 130, 140, and 150 can be offset laterally from one another and retained in place within the housing 102. For example, the housing 102 defines a center axis 170 that passes through the device 100, and the pressure indicators 130, 140, and 150 can be manually rotated within the housing 102, around axes that are parallel to and slightly offset from the center axis 170. The key 160 or tool can be used to rotate the pressure indicators 130, 140, 150. Each pressure indicators 130, 140, or 150 can each rotate about a different axis, and the axes can be offset from each other. For example, annular channels in the housing 102 can hold the pressure indicators 130, 140, 150 in their respective positions and guide the pressure indicators 130, 140, 150 about their respective axes during a calibration/adjustment step. In an alternate aspect, one or more of the pressure indicators 130, 140, and 150 could rotate about the center axis 170. The key 160 includes a shaft 162 and a distal end 164. The distal end 164 can mate with the pressure indicators 130, 140, and 150 as further described herein to allow a user to engage and rotate them.

The pressure indicator 130 can be a ring 136 with an indicator mark 132 protruding toward the center thereof. The pressure indicator 130 has an adjuster that allows the indicator mark 132 to be rotated around an axis parallel to the center axis 170. For example, the ring 136 of the pressure indicator 130 can form an internal gear geometry having the indicator 132 extend radially inward in place of certain teeth thereof. The adjuster of the pressure indicator 130 includes gear teeth 134 on the inner edge of the ring 136, as shown in FIG. 3. When the device 100 is assembled, the pressure indicator 130 has one degree of freedom that allows it to rotate about an axis parallel to the center axis 170. A portion of the pressure indicator 130 can rest against a protrusion channel 138 (FIG. 3). The protrusion channel 138 can be defined into the back bezel 120 and/or the front bezel 112. The pressure indicator 130 resting against the channel(s) can keep the pressure indicator from shifting around inside the housing 102 while still allowing rotation to a set position. In one aspect, when the device is assembled, the housing 102 applies a frictional force to the pressure indicator 130 to hold the pressure indicator 130 in position and restrict free rotation thereof within the annular channel 138. For example, a friction force can be applied to the pressure indicator 130 by the housing 102 to keep it in position. Additionally or alternatively, the device 100 can include a lock that holds the pressure indicator 130 in position. For example, a set screw could be used to lock the pressure indicator 130 in position. In some instances, the set screw could screw into the housing and may only tighten against the pressure indicator 130.

The pressure indicator 140 can be a ring 146 with an indicator mark 142 protruding toward the center thereof. The pressure indicator 140 has an adjuster that allows the indicator mark 142 to be rotated around an axis parallel to the center axis 170. For example, the ring 146 of the pressure indicator 140 can form an internal gear geometry having the indicator 142 extend radially inward in place of certain teeth thereof. The adjuster of the pressure indicator 140 includes gear teeth 144 on the inner edge of the ring 146, as shown in FIG. 3. When the device 100 is assembled, the pressure indicator 140 has one degree of freedom that allows it to rotate about an axis parallel to the center axis 170. A portion of the pressure indicator 140 can rest against a protrusion channel 148 (FIG. 3). The protrusion channel 148 can be defined into the back bezel 120 and/or the front bezel 112. The pressure indicator 140 resting against the channel(s) can keep the pressure indicator from shifting around inside the housing 102 while still allowing rotation to a set position. In one aspect, when the device is assembled, the housing 102 applies a friction force to the pressure indicator 140 to hold the pressure indicator 140 in position and restrict free rotation thereof within the channel 148. For example, a friction force can be applied to the pressure indicator 140 by the housing 102 to keep it in position. Additionally or alternatively, the device 100 can include a lock that holds the pressure indicator 140 in position. For example, a set screw could be used to lock the pressure indicator 140 in position. In some instances, the set screw could screw into the housing and may only tighten against the pressure indicator 140.

The pressure indicator 150 can be a ring 156 with an indicator mark 152 protruding toward the center thereof. The pressure indicator 150 has an adjuster that allows the indicator mark 152 to be rotated around an axis parallel to the center axis 170. For example, the ring 156 of the pressure indicator 150 can form an internal gear geometry having the indicator 152 extend radially inward in place of certain teeth thereof. The adjuster of the pressure indicator 150 includes gear teeth 154 on the inner edge of the ring 156, as shown in FIG. 3. When the device 100 is assembled, the pressure indicator 150 has one degree of freedom that allows it to rotate about an axis parallel to the center axis 170. A portion of the pressure indicator 150 can rest against a protrusion channel 158 (FIG. 3). The protrusion channel 158 can be defined into the back bezel 120 and/or the front bezel 112. The pressure indicator 150 resting against the channel(s) can keep the pressure indicator from shifting around inside the housing 102 while still allowing rotation to a set position. In one aspect, when the device is assembled, the housing 102 applies a frictional force to the pressure indicator 150 to hold the pressure indicator 150 in position and restrict free rotation thereof within the channel 158. For example, a friction force can be applied to the pressure indicator 150 by the housing 102 to keep it in position. Additionally or alternatively, the device 100 can include a lock that holds the pressure indicator 150 in position. For example, a set screw could be used to lock the pressure indicator 150 in position.

In some instances, the set screw could screw into the housing and may only tighten against the pressure indicator 150.

Referring to FIG. 5, the pressure indicators 130, 140, and 150 can be offset laterally from one another. Stated differently, the axis that pressure indicator 130 rotates about can be offset from the axis that pressure indicator 140 rotates about, which can also be offset from the axis that pressure indicator 150 rotates about. Referring to FIG. 4, the offsets can allow the key 160 (FIG. 2, 2A) to be inserted through the housing 102 at different locations, such as holes 106, 108, and 110 in the lens 104 to engage the different pressure indicators 130, 140, and 150 therethrough. For example, a user can insert the key 160 through the housing 102 to engage each of the pressure indicators 130, 140, and 150.

In other aspects of the present disclosure, the pressure indicators 130, 140, and 150 could rotate around the center axis 170 and the pressure indicators 130, 140, and 150 could have differing radiuses to provide an offset therebetween. For example, t different radii can allow the key 160 to engage the pressure indicators 130, 140, and 150 at different locations, such as the different holes 106, 108, and 110.

When the key 160 engages a pressure indicator 130, 140, or 150, a user can apply a force to the pressure indicator with the key 160, and the force can be sufficient to overcome the friction force holding the pressure indicator in place. The force can allow the pressure indicator to rotate. When the key 160 is removed, the friction force on the pressure indicator can be sufficient to keep the pressure indicator in a position set by the user. The key 160 can be required to move the pressure indicators 130, 140, and 150. The required key (like key 160) can ensure that the pressure indicators 130, 140, and 150 are not accidentally moved. For example, in an emergency situation, when things can be bumped and/or subject to significant vibrations, it is beneficial that the pressure indicators 130, 140, and 150 are held in place unless someone deliberately moves them with the key 160.

In use, the key 160 can be inserted through the hole 106 in the lens 104 and the hole 114 in the front bezel 112 to engage the pressure indicator 130. The hole 106 in the lens 104 is aligned with the hole 114 in the front bezel 112. Upon inserting the key 160 through the holes 106 and 114, teeth 166 at a distal end 164 of the key 160 are configured to mate with teeth 134 along the inside circumference of the pressure indicator 130. A user can rotate the key 160, which exerts a force on the pressure indicator 130 that is sufficient to overcome the friction force holding it in place. As a result, the user can rotate the indicator mark 132 to a desired position that corresponds to an ideal pressure on the pressure gauge 190. When the user stops rotating the key 160 and the pressure indicator 130, the friction force applied to the pressure indicator 130 by the housing 102 keeps the pressure indicator 130 in place.

The key 160 can similarly unlock the pressure indicators 140 and 150 by engaging teeth 144 and 154, respectively, accessible through holes 108 and 110, respectively, in the lens 104 and holes 116 and 118, respectively, in the front bezel 112.

In some aspects, the pressure indicators 130, 140, and 150 are colored to provide a quick visual aid for a user to distinguish them. For example, the different colors are indicated with different hatch patterns in FIGS. 2-5. In certain instances, the colors could be based on information from the National Fire Protection Association. In an alternative aspect, the pressure indicators 130, 140, 150 are the same color. In other instances, the indicator marks can be different colors and/or different lengths, widths, and/or have different marks to distinguish each pressure indicators 130, 140, and 150 and associate the respective pressure indicator with the corresponding circumstances/hose setup indicated on the label.

In some aspects, each indicator mark 132, 142, or 152 can be designed to indicate or point to a single of pressure on a pressure gauge. In some aspects, multiple indicator marks 132, 142, and/or 152 could be used to indicate a range of pressures on a pressure gauge. In still another aspect, a single indicator mark 132, 142, or 152 could be designed to indicate a range of pressures on a pressure gauge. In yet another aspect, indicator marks 132 and 142 could be designed to indicate or point to a single pressure on a pressure gauge and indicator mark 152 could be designed to indicate a range of pressures on a pressure gauge. Various other combinations are also envisioned.

In certain instances, the device 100 can be water-resistant or water-proof. The back bezel 112 or mounting ring 124 can seal tightly against the pressure gauge. Moreover, the housing 102 can be water-resistant or water-proof when assembled. Inserts can be placed in the holes 106, 108, and 110 of the lens to seal the front surface of the pressure gauge after setting the ideal pressure(s). A water-tight seal can ensure moisture does not enter the device 100 and/or enter between the device 100 and the pressure gauge, which could obstruct visibility and/or lead to deterioration of the device 100.

The device 100 defines a location 180 on the front of the lens 104, where a label and/or sticker can be located. The label allows a user to place information specific to the particular circumstance when the pressure indicated by each pressure indicator is desired. For example, the label could indicate that the pressure indicator 130 is for a first hose configuration and the pressure indicator 140 is for a second hose configuration. Additionally, the location 180 can also provide an area where an indicator mark of a pressure indicator can be positioned when not in use. When a sticker is placed at the location 180, the indicator mark of the unused pressure indicator would be hidden (i.e. not visible) to the user. For example, a user could have the indicator mark 132 set at 100 psi on the pressure gauge, the indicator mark 142 could be set at psi on the pressure gauge, and the indicator mark 152 could be hidden from the user with the indicator mark 152 being located behind a sticker at the location 180. The sticker in this example could describe the different hose configurations corresponding to the indicator mark 132 and the indicator mark 142. Examples of hose configurations are hose length, hose diameter, and different nozzles, such as an adjustable nozzle or a smooth bore nozzle, for example, where each configuration requires a different and specific discharge pressure.

Each indicator mark 132, 142, and 152 can be rotated approximately 300° including the area behind the location 180. Once the indicator marks 132, 142, and 152 are set, they require further adjustment only if the desired pressure changes, such as when a new hose configuration is setup, and adjusting the indicator marks 132, 142, and 150 can be achieved simply and quickly with the key 160.

A method of determining ideal pressures to indicate with the device 100 will now be described as an example. Though the methods are described for use with a fire truck hose discharge gauge, the reader will appreciate that device 100 can be used with any pressure gauge and the method can be adjusted accordingly. FIG. 7 shows a calibration flow diagram 200 for setting the ideal pressure on the device 100 for use with a fire truck pressure gauge. At step 202, the device 100 is mounted to the pressure gauge. At step 204, testing is performed to determine the ideal pressure(s) for one or more discharge configurations. The discharge configurations can depend on the hose length, equipment, and nozzle that are commonly used with the fire truck. Once the discharge configuration is attached to the fire truck water discharge and the device 100 is attached to the water discharge pressure gauge, a user can determine the ideal water pressure. One way to determine the ideal water pressure is to use a flow meter at the end of the discharge configuration, such as end of a hose, and adjust the water pressure until the desired water flow is reached. Once the ideal water pressure is determined, the appropriate indicator mark 132, 142, or 152 can be moved to indicate the ideal water pressure. At step 206, the key 160 is used to move an indicator mark 132, 142, or 152 to the ideal water discharge pressure. Then, at step 208, the discharge configuration information along with the corresponding indicator mark 132, 142, or 152 can be added to the label or sticker at location 180. The method can be repeated for different discharge configurations and indicator marks. When a new discharge configuration is attached to the fire truck water discharge, the same method can be used to determine a new ideal water pressure, adjust the indicator to that pressure, and update the label with the new discharge configuration. Once the indicator marks 132, 142, and 152 are set, they require further adjustment only if the desired pressure changes and adjusting the indicator marks 132, 142, and 152 is achieved simply and quickly with the key 160. The reader will appreciate that various steps can occur in a different order than shown in FIG. 7. For example, the label can be attached to the device (step 208) after the testing is performed (step 204) and before the pressure indicators are moved to the ideal pressures (step 206). In other instances, each hose configuration can be tested (step 204), each indicator device can be adjusted (step 206), and information can be added to the label (step 208) in turn for each hose configuration and pressure indicator.

A method of using the device 100 after calibration with a fire truck hose discharge gauge will now be described. However, the reader will readily appreciate that the device 100 can be used with any pressure gauge. FIG. 8 shows a flow diagram 250 for using the device 100 with a fire truck pressure gauge. At step 252, a discharge configuration is connected to an output associated with a particular pressure gauge. The discharge configuration that is connected to the pressure gauge has an ideal pressure that corresponds to an indicator mark 132, 142, 152, in various instances. The discharge configuration information can be located on the label of the device 100. At step 254, water is pumped/supplied through the discharge configuration until the pressure reaches the correct indicator mark 132, 142, or 152. At step 256, the device 100 is observed by an operator to ensure that the correct water pressure is maintained.

Figure 9:
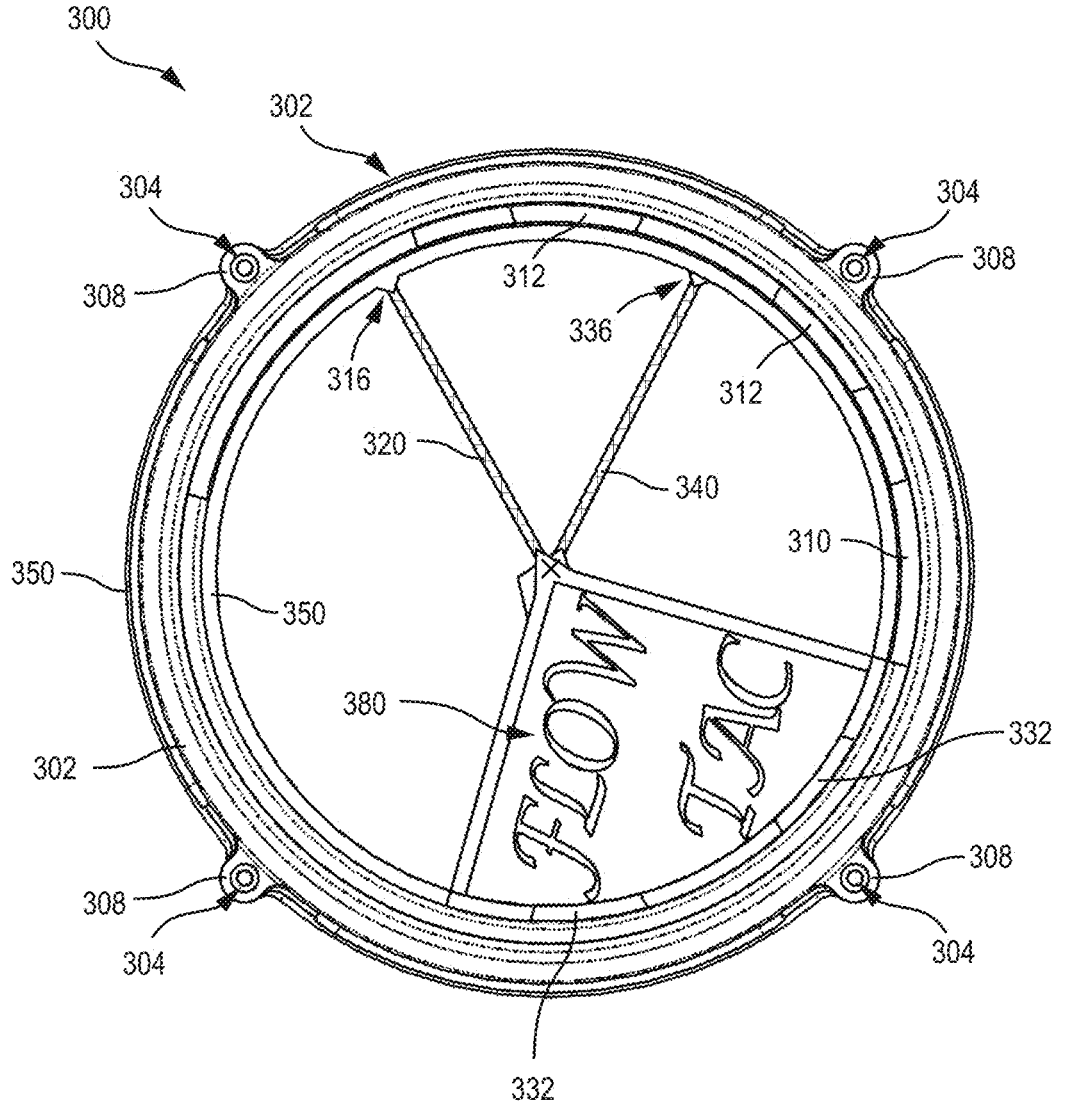
FIG. 9 is a front view of a device attachable to a pressure gauge, according to at least one aspect of the present disclosure.
Figure 10:
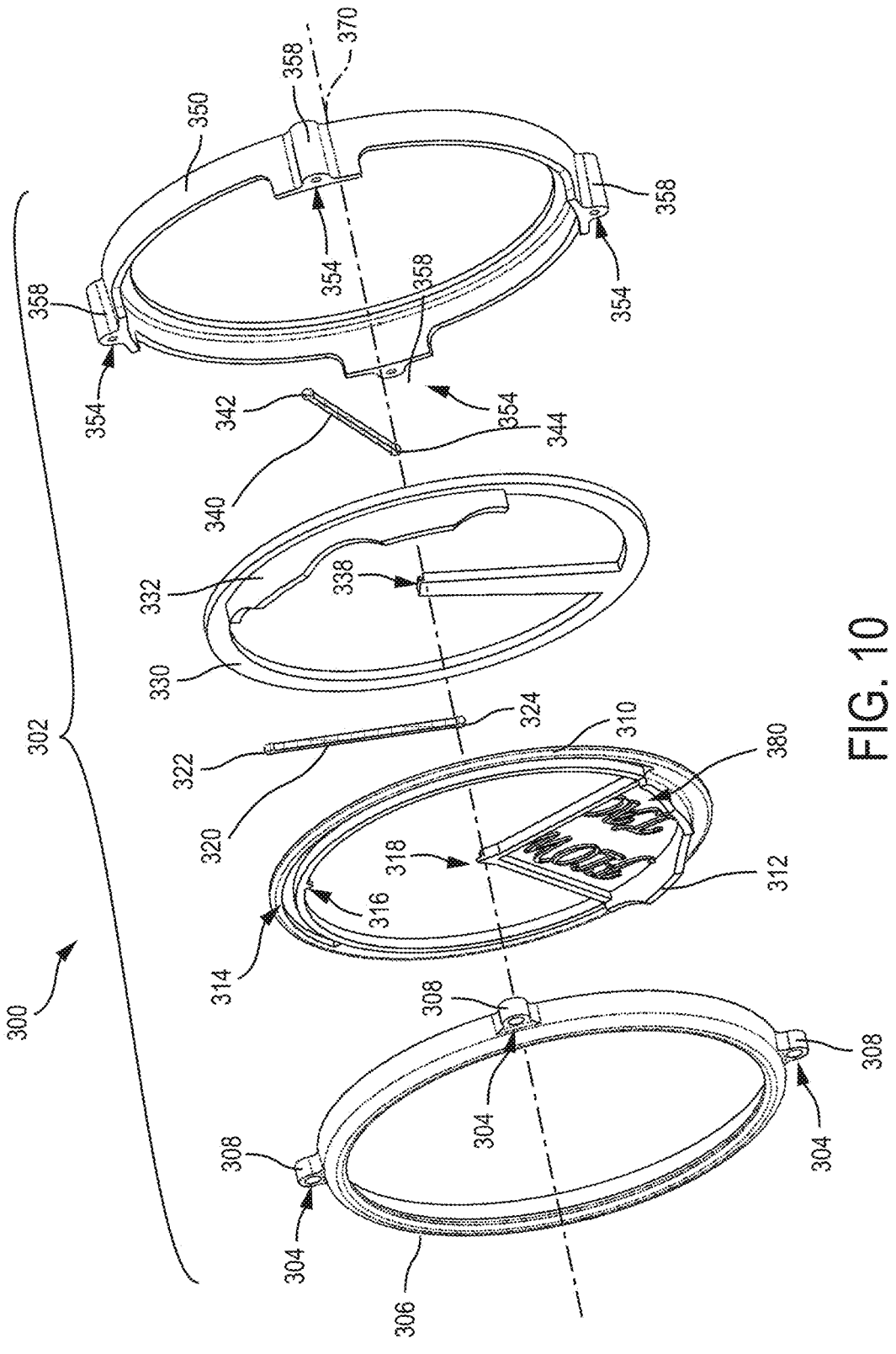
FIG. 10 is an exploded perspective view of the device of FIG. 9, according to at least one aspect of the present disclosure.

FIGS. 9 and 10 illustrate a device 300 that is configured to be attached to pressure gauge (like one of the gauges 50 in FIG. 1) to overlay one or more ideal pressures on the pressure gauge. The device 300 is similar to the device 100 in many aspects and can perform a similar indicator function. For the sake of brevity, not all similarities will be described in detail. The device 300 includes a front bezel 306 and a back bezel 350. The device 300 is mounted to a pressure gauge at the back bezel 350. For example, the device 300 can be attached to the pressure gauge using an adhesive and/or other fasteners.

The device 300 has a housing 302 formed by the front bezel 306 and the rear bezel 350. The housing 302 encloses and retains two pressure indicators 320 and 340 and two adjusters 310 and 330. In at least one aspect, the pressure indicators 320, 340 are the same color. In an alternative aspect, the pressure indicators 320, 340 are the different colors. The front bezel 306 attaches to the back bezel 350 by aligning protrusions 308 on the front bezel 306 with protrusions 358 on the back bezel 350 such that the holes 304 in protrusions 308 are aligned with holes 354 in protrusions 358. Screws can be inserted through the holes 304, 354 to attach the front bezel 306 to the back bezel 350, for example. In an alternative aspect, the front bezel 306 could be attached to the back bezel 350 with an adhesive. When the device 300 is assembled, the pressure indicators 320 and 340 and adjusters 310 and 330 are located inside of the housing 302. The housing 302 defines a center axis 370 that passes through the device 300, and the adjusters 310 and 330 can be manually rotated around the center axis 370, which rotates the pressure indicators 320 and 340, respectively, around the center axis 370.

The pressure indicator 320 is a shaft or needle with a first end 322 and a second end 324. The pressure indicator 320 attaches to adjuster 310, which is rotatable to pivot the pressure indicator 320 about the center axis 370. In certain instances, the first end 322 can be attached to a protrusion 316 and the second end 324 can be attached to a protrusion 318. For example, an adhesive can be used to attach the first end 322 with protrusion 316 and the second end 324 with protrusion 318. Once the pressure indicator 320 is attached to the adjuster 310, then rotation of the adjuster 310 about the center axis 370 pivots the pressure indicator 320. When the pressure indicator 320 is attached to the adjuster 310, it fits within the thickness of the adjuster 310. As such, when the device 300 is assembled, the pressure indicator 320 will not get caught on the adjuster 330 when the adjuster 310 is moved relative thereto. The adjuster 310 has finger grips 312 that project from adjuster 310 and allow a user to rotate the adjuster 310 about the center axis 370. When the device 300 is assembled, the finger grips 312 extend toward the front edge the front bezel 306 so that the user can easily reach them to rotate the adjuster 310. In certain instances, the finger grips 312 extend level with the front edge.

The adjuster 310 has a surface 380 where a label and/or sticker can be located. The sticker allows a user to place information specific to the circumstance (e.g. hose configuration) corresponding to the ideal pressure indicated by the pressure indicator 320, 340. For example, the sticker could indicate that the pressure indicator 320 is for a first hose configuration and that the pressure indicator 340 is for a second hose configuration.

The pressure indicator 340 is a shaft or needle with a first end 342 and a second end 344. The pressure indicator 340 attaches to an adjuster 330, which is rotatable to pivot the pressure indicator 340 about the center axis 370. In certain instances, the first end 342 can be attached to a protrusion 336 and the second end 324 can be attached to a protrusion 338. For example, an adhesive can be used to attach the first end 342 with protrusion 336 and the second end 344 with protrusion 338. Once the pressure indicator 340 is attached to the adjuster 330, rotation of the adjuster 330 about the center axis 370 rotates the pressure indicator 340. When the pressure indicator 340 is attached to the adjuster 330, it fits within the thickness of the adjuster 330. As such, when the device 300 is assembled, the pressure indicator 340 will not get caught on back bezel 350 when the adjuster 330 is moved relative thereto. The adjuster 330 has finger grips 332 that allow a user to rotate the adjuster 330 about the center axis 370. When the device 300 is assembled, the finger grips 332 extend toward the front edge of the front bezel 306 through the channel 314 in adjuster 310. The user can easily reach the finger grips 332 to rotate the adjuster 330. In certain instances, the finger grips 332 extend level with the front edge of the front bezel 306.

When the device 300 is assembled, the housing 302 can exert a force on the adjusters 310 and 330 to hold them in position and not allow them to rotate freely. For example, the housing 302 can apply a friction force to the adjusters 310 and 330 to keep them in position. A user can exert a force on the adjuster 310 or 330 using the finger grips 312 or 332, respectively, that is sufficient to overcome the friction force holding it in place. As a result, the user can rotate the pressure indicator 320 or 340 to a desired position that corresponds to an ideal pressure on the pressure gauge. When the user stops rotating the adjuster 310 or 330, the friction force applied to the adjuster 310 or 330 by the housing 302 seeks to hold or lock the pressure adjuster 310 or 330 in place.

Figure 11:
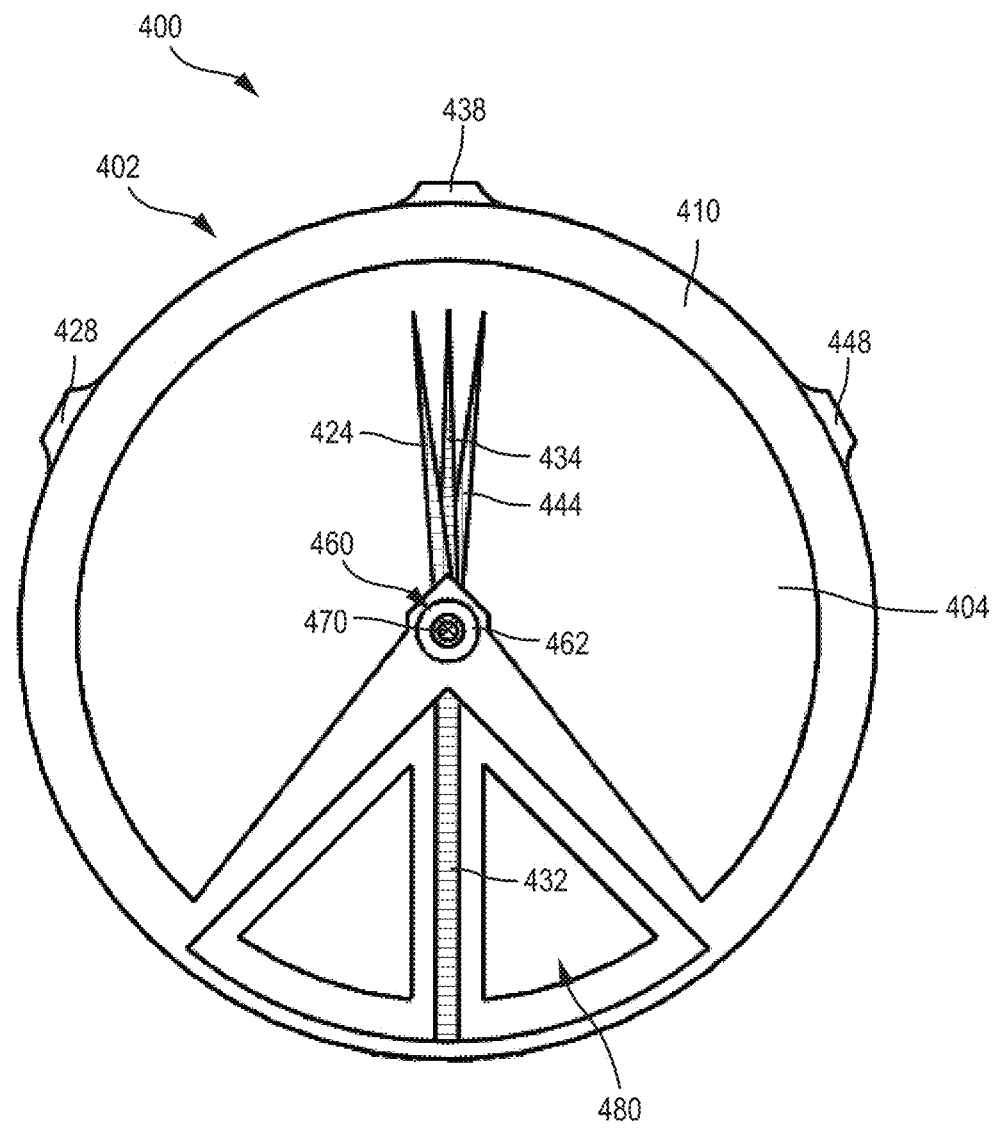
FIG. 11 is a front view of a device attachable to a pressure gauge, according to at least one aspect of the present disclosure.
Figure 12:
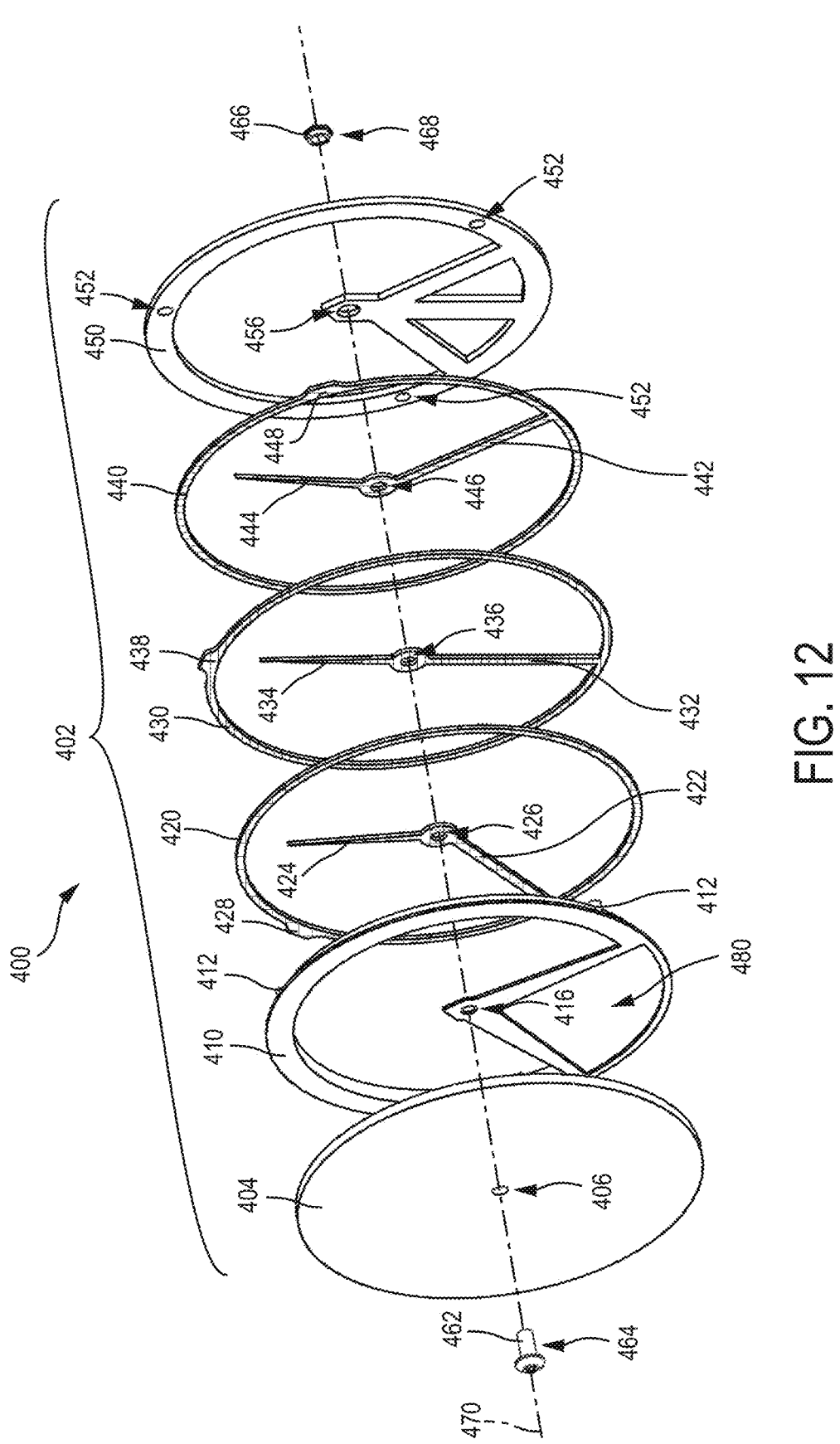
FIG. 12 is an exploded view of the device of FIG. 11, according to at least one aspect of the present disclosure.

FIGS. 11 and 12 illustrate a device 400 that is configured to be attached to a pressure gauge (like one of the pressure gauges 50 in FIG. 1) to overlay an ideal pressure on the pressure gauge. The device 400 is similar to the device 100 and in many aspects performs a similar indicator function. For the sake of brevity, not all similarities will be described in detail. The device 400 includes a lens 404, a front bezel 410, and a back bezel 450. The device 400 is mounted to a pressure gauge at the back bezel 450. For example, the device 400 can attach to the pressure gauge using an adhesive.

The device 400 has a housing 402 formed by the lens 404, the front bezel 410, and the rear bezel 450. The housing 402 encloses and retains three pressure indicators 420, 430, and 440. In at least one aspect, the pressure indicators 420, 430, 440 are different colors. In an alternative aspect, one or more pressure indicators 420, 430, 440 are the same color. The reader will readily appreciate that there could be more than or less than three pressure indicators retained in the housing 402. The lens 404, or transparent front cover, is attached to the front bezel 410. In one aspect, the lens 404 can be attached to the front bezel 410 with an adhesive. The front bezel 410 is attached to the back bezel 450. In certain instances, the front bezel 410 has alignment pins 412, or rods, that insert into alignment holes 452 of the back bezel 450, when the front bezel 410 is attached to the back bezel 450. In one aspect, the front bezel 410 could be attached to the back bezel 450 by a screw 462 and a nut 466. In some instances, the nut 466 could be recessed in a hole 456 of the back bezel 450, and the screw 462 could extend through the front of the housing 402 to reach the nut 466. For example, the screw 462 could extend through the hole 406 in the lens 404 and through the hole 416 in the front bezel 410. In an alternative aspect, the front bezel 410 can be attached to the back bezel 450 by an adhesive. When the device 400 is assembled, the pressure indicators 420, 430, and 440 are located inside of the housing 402 behind the lens 404. The housing 402 defines a center axis 470 that passes through the device 400, and the pressure indicators 420, 430, and 440 can be manually rotated around the center axis 470.

The pressure indicator 420 can be ring-shaped with an arm 422 that protrudes toward the center thereof. At the center of the pressure indicator 420, which is located at the end of the arm 422, is a central core with a hole 426 aligned with the center axis 470. An indicator mark 424 (FIG. 12) extends from the central core toward the edge of the pressure indicator 420. The pressure indicator 420 has an adjuster grip 428 that allows a user to pivot the indicator mark 424 about the center axis 470. When the device 400 is assembled, the adjuster grip 428 extends outside of the housing 402. For example, the adjuster grip 428 could be a protrusion that extends outside of the housing 402. The pressure indicator 420 has only one degree of freedom that allows it to rotate about the center axis 470. When the device is assembled, the screw 462 can extend through the hole 426 in the pressure indicator 420, and the pressure indicator 420 can pivot about the screw 462. In one aspect, the housing 402 applies a friction force to the pressure indicator 420 to hold the pressure indicator 420 in position and restrict free rotation thereof. For example, the friction force could be applied by the housing 402 through tightening the screw 462. In some instances, a user can apply a force to the adjuster grip 428 that is sufficient to overcome the friction force and allow the pressure indicator 420 to pivot about the center axis 470. This could allow the user to rotate the indicator mark 424 to a desired position that corresponds to an ideal pressure on the pressure gauge.

Pressure indicators 430 and 440 operate similar to pressure indicator 420. For the sake of brevity, not all similarities will be described in detail. Similar to pressure indicator 420, pressure indicators 430, 440 have arms 432, 442, holes 436, 446, indicator marks 434, 444, and adjuster grips 438, 448, respectively. When the device 400 is assembled, the adjuster grips 438, 448 extend outside of the housing 402. The pressure indicators 430, 440 have only one degree of freedom that allows them to rotate about the center axis 470. When the device is assembled, the screw 462 can extend through the holes 436, 446 in pressure indicators 430, 440, respectively. In one aspect, the housing 402 applies a compressive force to the pressure indicators 430, 440 to hold them in position and restrict free rotation via friction. For example, a friction force could be applied by the housing 402 through tightening the screw 462. In some instances, a user can apply a force to the adjuster grips 438, 448 that is sufficient to overcome the friction force and allow the pressure indicators 430, 440, respectively, to pivot about center axis 470. This could allow the user to rotate the indicator mark 434 and/or the indicator mark 444 to a desired position that corresponds to an ideal pressure on the pressure gauge.

The device 400 also includes a lock 460, which includes the screw 462 and nut 466. In some aspects, the nut 466 may be attached inside of a hole 456 in the center of the back bezel 450. For example, the nut 466 could be attached inside of the hole 456 with an adhesive. In some aspects, the screw 462 may extend through the housing 402 to reach the nut 466. For example, the screw 462 could extend through the hole 406 in the lens and through the hole 416 in the front bezel 410 to enter the housing 402. Inside the housing 402, the screw 462 can extend through the holes 426, 436, and 446 in the pressure indicators 420, 430, and 440 to reach the nut 466. In certain instances, when the screw is tightened, threads 464 of the screw 462 can be configured to mate with threads 468 of the nut 466. In some instances, tightening the screw 462 and nut 466 can lock the pressure indicators 420, 430, and 440 in position. For example, tightening the screw 462 can apply a compression force to the housing 402 and/or pressure indicators 420, 430, and 440 therein, which is sufficient to lock the pressure indicators 420, 430, and 440 in position. In some aspects, the screw 462 can be loosened to allow a user to adjust the pressure indicators 420, 430, and 440, and once adjustments are complete the user can retighten the screw 462 to relock the pressure indicators 420, 430, and 440 in place.

The lens 404 has a location 480 where a label and/or sticker can be located. The label allows a user to place information specific to the circumstance (e.g. hose configuration) corresponding to the ideal pressure indicated by a pressure indicator 420, 430, or 440. For example, the label could indicate that the pressure indicator 420 is for a first hose configuration, that the pressure indicator 430 is for second hose configuration, and that the pressure indicator 440 is not being used.

FIGS. 13-17 illustrate a device 500 that is configured to be attached to a pressure gauge (like one of the pressure gauges 50 in FIG. 1) to overlay an ideal pressure on the pressure gauge. The device 500 is similar to the device 100 and in many aspects operates the same and performs a similar indicator function. For the sake of brevity, not all similarities will be described in detail. For example, housing 502, lens 504, hole 506, hole 508, hole 510, front bezel 512, hole 514, hole 516, hole 518, back bezel 520, pressure indicator 530, indicator mark 532, gear teeth 534, ring 536, pressure indicator 540, indicator mark 542, gear teeth 544, ring 546, pressure indicator 550, indicator mark 552, gear teeth 554, ring 556, center axis 570, location 580 of device 500 function the same as housing 102, lens 104, hole 106, hole 108, hole 110, front bezel 112, hole 114, hole 116, hole 118, back bezel 120, pressure indicator 130, indicator mark 132, gear teeth 134, ring 136, pressure indicator 140, indicator mark 142, gear teeth 144, ring 146, pressure indicator 150, indicator mark 152, gear teeth 154, ring 156, center axis 170, location 180 of device 100, respectively. In some aspects, front bezel 512 and back bezel 520 can be in any color.

Figure 14:
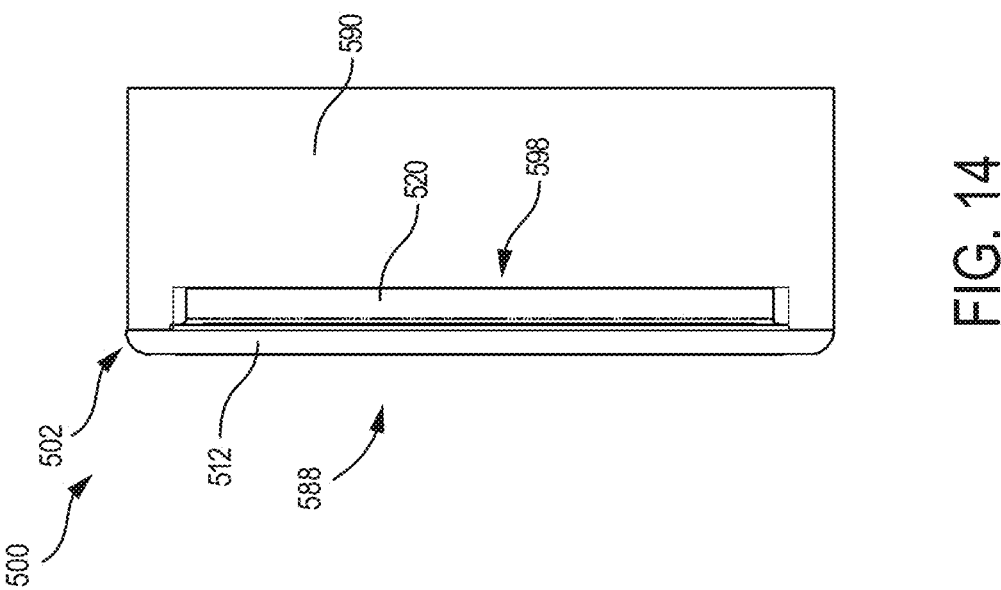
FIG. 14 is a side view of the device of FIG. 13, according to at least one aspect of the present disclosure.

Referring to FIG. 14, the device 500 is attached to the pressure gauge 590 at the back side 598 of the device 500. For example, the device 500 can mount to a surface mount style gauge with an external bezel. In at least one aspect, the mounting is accomplished by fitting and attaching the back side 598 of the device 500 inside the ring of the bezel. In at least one aspect, double sided mounting tape is used to attach the device 500 to the surface mount style gauge. A user looks through the front side 588 of the device 500 to see the values on the pressure gauge 590. The user can then use a key 160 (FIG. 2, 2A) to rotate pressure indicator 530, 540, or 550 into alignment with a specific pressure on the pressure gauge 590.

Figure 13:
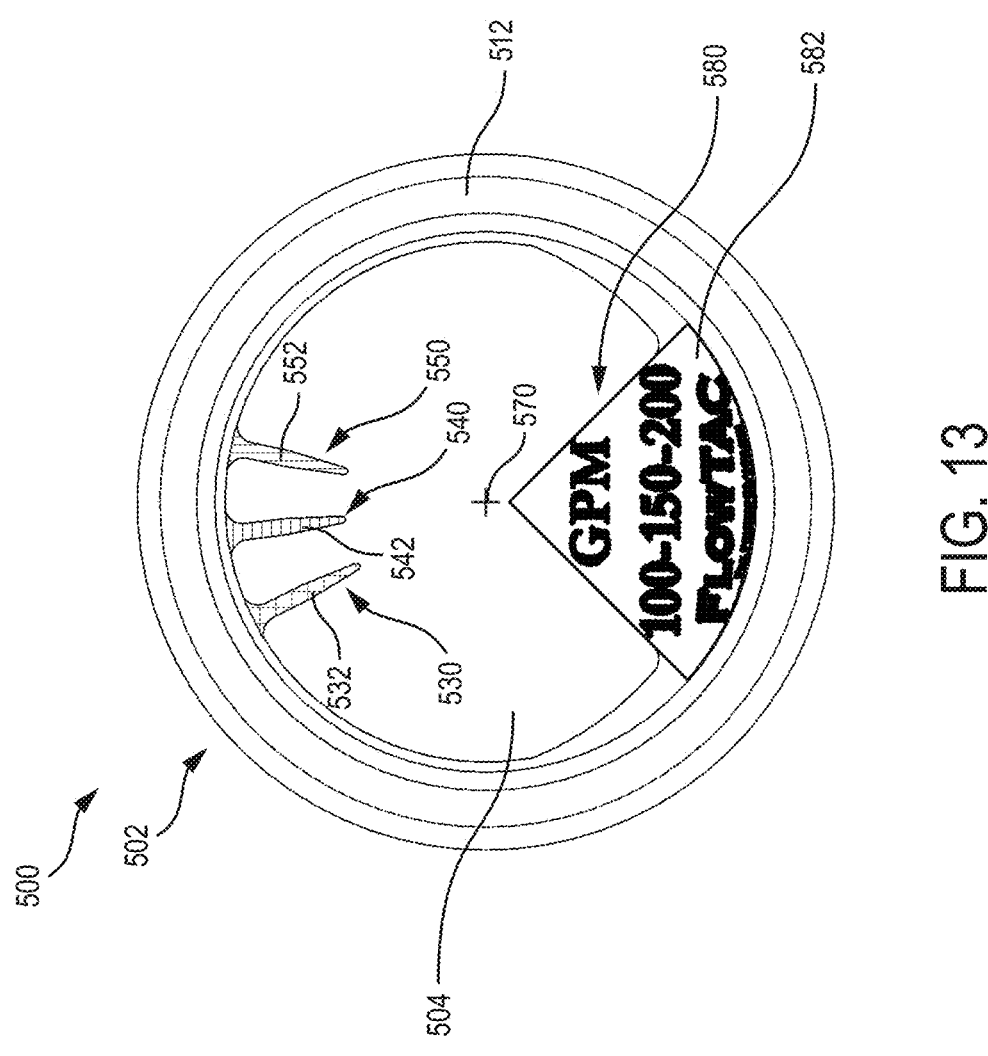
FIG. 13 is a front view of a device attachable to a pressure gauge, according to at least one aspect of the present disclosure.
Figure 15:
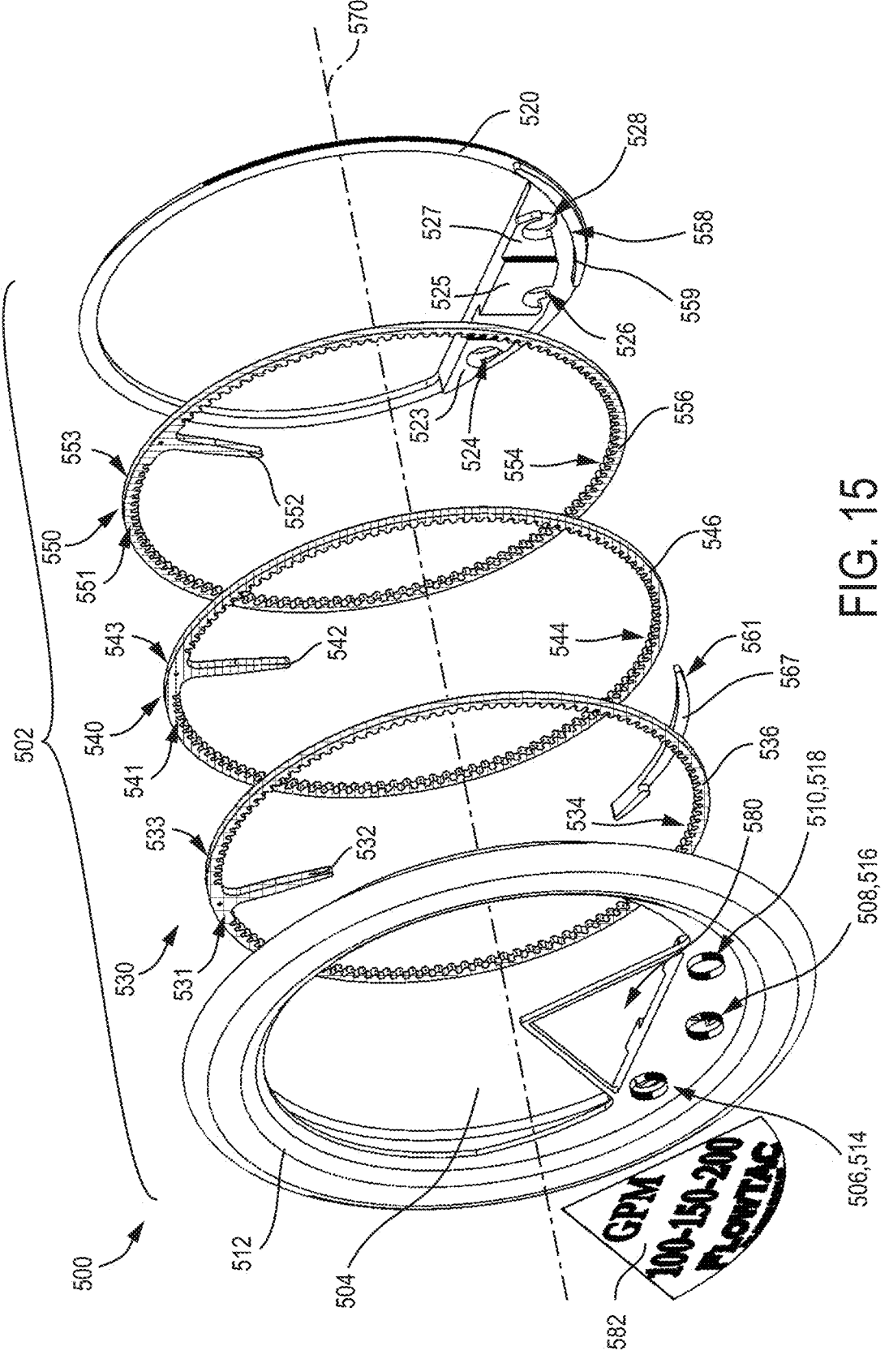
FIG. 15 is an exploded view of the device of FIG. 13, according to at least one aspect of the present disclosure.

Referring to FIG. 13, an example label 582 and/or sticker is placed in the location 580 of the device 500. The label 582 can indicate specific values for each pressure indicator for example value "100" for pressure indicator 530, value "150" for pressure indicator 540, and value "200" for pressure indicator 550. The labels 582 can be customized to have any pressure values desired for each indicator. In at least one aspect, a color of the pressure value on the label 582 corresponds to a color of a pressure indicator 530, 540, 550. For example, the color of pressure indicator 530 could be green, the color of the pressure indicator 540 could be yellow, and the color of the pressure indicator 550 could be red and the color of the pressure values on the label 582 could correspond to those colors, e.g. value "100" in green, value "150" in yellow, and value "200" in red. While the values "100", "150", and "200" are shown on the label 582, any desired values could be chosen by the user. Referring to FIG. 15, in at least one aspect, the label 582 covers the holes 506, 508, 510 in the lens 504 and the holes 514, 516, 518 in the front bezel 512. With the holes 506, 508, 510, 514, 516, 518 covered, a user is prevented from adjusting the pressure indicators 530, 540, 550 without first removing the label 582. As such, the pressure indicators 530, 540, 550 should correspond to the pressure values on the label 582, since an old label 582 would need removed and a new label 582 placed after any adjustments.

Each pressure indicator 530, 540, 550 rotates about the center axis 570. In at least one aspect, the annular channels 538, 548, 558 in the housing 502 hold the pressure indicators 530, 540, 550 in their respective positions and guide the pressure indicators 530, 540, 550 about the center axis 570 during a calibration/adjustment step. The front bezel 512, the back bezel 520, and an indicator spacer 561 define the annular channels 538, 548, 558. In at least one aspect, the indicator spacer 561 allows for easier manufacturing and assembly of the device 500 compared to the device 100. For example, the front bezel 512 and the back bezel 520 do not alone define the annular channels 538, 548, and 558. For example, the indicator spacer is part of the annular channel 548. In at least one aspect, the device 100 has the annular channels 138, 148, and 158 defined in the front bezel 112 and back bezel 120 alone.

The pressure indicator 530 rests in annular channel 538, the pressure indicator 540 rests in annular channel 548, and the pressure indicator 550 rests in annular channel 558. In at least one aspect, the annular channels 538, 548, 558 have a width along the center axis 570 that matches a width of the pressure indicators 530, 540, 550 rings along the center axis 570. In at least one aspect, the annular channels 538, 548, 558 rest against one another along the center axis 570.

In at least one aspect, upon assembly of the device 500, a first side 531 of the pressure indicator 530 rests against the front bezel 512, a second side 533 of the pressure indicator 530 rests against a first side 541 of the pressure indicator 540, a second side 543 of the pressure indicator 540 rests against a first side 551 of the pressure indicator 550, and a second side 553 of the pressure indicator 550 rests against the back bezel 520. Each first side 531, 541, 551 is opposite the second side 533, 543, 553 of the pressure indicator 530, 540, 550, respectively.

Figure 17:
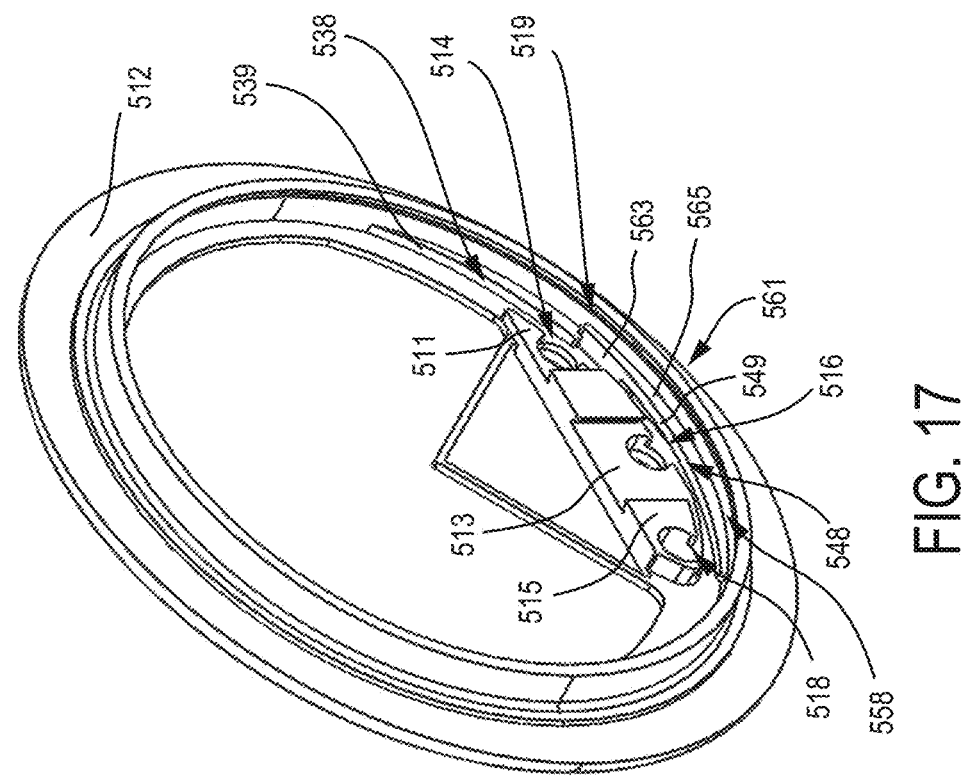
FIG. 17 is a perspective view of the device of FIG. 13 with the indicator spacer installed, according to at least one aspect of the present disclosure.
Figure 16:
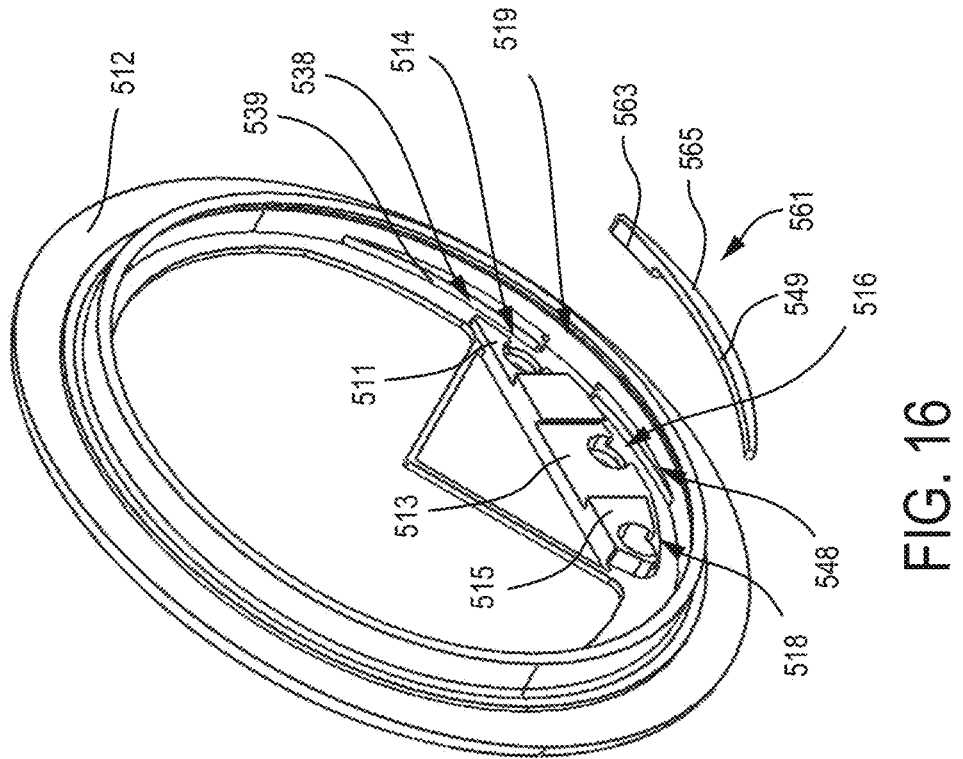
FIG. 16 is a perspective view of the device of FIG. 13 and an indicator spacer, according to at least one aspect of the present disclosure.

The annular channels 538, 548, 558 have non-circular sections 539, 549, 559 that are offset from each other radially so each pressure indicator 530, 540, 550 can be adjusted individually. Each pressure indicator 530, 540, 550 is made of a flexible material, e.g. a flexible plastic or flexible metal, that allows each pressure indicator 530, 540, 550 to deform as it rotates around in its respective annular channel 538, 548, 558. Referring to FIG. 16, the non-circular section 539 of annular channel 538 deforms the ring 536 so that a portion of the ring 536 is moved into alignment with hole 514, which allows the tool 160 to enter through hole 514 and only adjust pressure indicator 530. Referring to FIG. 17, the non-circular section 549 of annular channel 548 deforms the ring 546 so that a portion of the ring 546 is moved into alignment with hole 516, which allows the tool 160 to enter through hole 516 and only adjust pressure indicator 540. The non-circular section 549 is part of the indicator spacer 561. Referring to FIG. 15, the non-circular section 559 of annular channel 558 deforms the ring 556 so that a portion of the ring 556 is moved into alignment with hole 518, which allows the tool 160 to enter through hole 518 and only adjust pressure indicator 550. Each non-circular section 539, 549, 559 is offset radially from each other to allow the tool to only adjust one pressure indicator 530, 540, 550 at a time. For example, the pressure indicator 530 deforms to align only with hole 514 and remains circular otherwise which allows the pressure indicator 530 to avoid hole 516 and hole 518.

In at least one aspect, pressure indicators 530, 540, 550 are held in position by the housing 502 until they are moved by tool 160. In at least one aspect, the deformation of the rings 536, 546, 556 of the pressure indicators 530, 540, 550 provides a force, e.g. a frictional force, that hold the pressure indicators 530, 540, 550 in position after the device 500 is assembled. In an alternative aspect, a frictional force is applied to the pressure indicators 530, 540, 550 due to compression of the pressure indicators 530, 540, 550 within the housing. For example, the pressure indicators 530, 540, 550 all rest against one another in the housing 502 and a compressive force could be applied to them along the center axis 570 by the housing 502. In yet an alternative aspect, both the deformation of the rings 536, 546, 556 and a compressive force applied along the center axis 570 from the housing 502 hold the pressure indicators 530, 540, 550 in position.

Referring to FIGS. 16 and 17, upon assembly of the housing 502, a protrusion 563 of the indicator spacer 561 rests in a gap 519 of the front bezel 512, which holds the indicator spacer 561 in position. In at least one aspect, a surface 567 of the indicator spacer 561 rests against the second side 533 of ring 536 and a surface 565 of the indicator spacer 561 rests against the first side 551 of ring 556.

When the front bezel 512 is attached to the back bezel 520, a surface 515 of the front bezel 512 rests against a surface 527 of the back bezel 520, a surface 513 of the front bezel 512 rests against a surface 525 of the back bezel 520, and a surface 511 of the front bezel 512 rests against a surface 523 of the back bezel 520. The surface 527 defines a hole 528 that aligns with hole 518 in the front bezel 512, the surface 525 defines a hole 526 that aligns with hole 516 in the front bezel 512, and the surface 523 defines a hole 524 that aligns with hole 514 in the front bezel 512. Referring to FIG. 15, upon assembly of the housing 502, the second side 553 of the ring 556 of the pressure indicator 550 rests against the back of hole 528, the second side 543 of the ring 546 of the pressure indicator 540 rests against the back of hole 526, and the second side 533 of the ring 536 of the pressure indicator 530 rests against the back of hole 524. The first side of ring 556 rests against the indicator spacer 561. The annular channels 538, 548, 558 are offset at a depth that matches the surfaces 511, 513, 515, respectively.

The holes 524, 526, 528 go to a depth and are aligned with the non-circular sections 539, 549, 559 on each pressure indicator 530, 540, 550 that allow the tool 160 to only adjust one pressure indicator 530, 540, 550 per hole 524, 526, 528, respectively. For example, the tool 160 can be inserted into a hole formed from holes 510, 518, 528 to adjust the pressure indicator 550, the tool 160 can be inserted into a hole formed from holes 508, 516, 526 to adjust the pressure indicator 540, and the tool 160 can be inserted into a hole formed from holes 506, 514, 524 to adjust the pressure indicator 530. A portion of ring 536 is deformed by the non-circular section 539 to move the gear teeth 534 into the hole 524 such that the tool 160 can mate with the gear teeth 534 to rotate the pressure indicator 530 about the center axis 570. A portion of ring 546 is deformed by the non-circular section 549 to move the gear teeth 544 into the hole 526 such that the tool 160 can mate with the gear teeth 544 to rotate the pressure indicator 540 about the center axis 570. A portion of ring 556 is deformed by the non-circular section 559 to move the gear teeth 554 into the hole 528 such that the tool 160 can mate with the gear teeth 554 to rotate the pressure indicator 550 about the center axis 570.

In at least one aspect, the pressure indicator 550 and the indicator spacer 561 could be removed from the device 500, which would allow the device 500 to only have 2 pressure indicators 530, 540. For example, the pressure indicator 550 could be an optional pressure indicator that requires the indicator spacer 561.

FIGS. 18-22 illustrate a device 600 that is configured to be attached to a pressure gauge (like one of the pressure gauges 50 in FIG. 1) to overlay an ideal pressure on the pressure gauge. The device 600 is similar to the device 100 and device 500 and in many aspects operates the same and performs a similar indicator function. For the sake of brevity, not all similarities will be described in detail. For example, housing 602, lens 604, hole 606, hole 608, hole 610, front bezel 612, hole 614, hole 616, hole 618, back bezel 620, pressure indicator 630, indicator mark 632, gear teeth 634, ring 636, pressure indicator 640, indicator mark 642, gear teeth 644, ring 646, pressure indicator 650, indicator mark 652, gear teeth 654, ring 656, center axis 670, location 680 of device 600 function the same as housing 102, lens 104, hole 106, hole 108, hole 110, front bezel 112, hole 114, hole 116, hole 118, back bezel 120, pressure indicator 130, indicator mark 132, gear teeth 134, ring 136, pressure indicator 140, indicator mark 142, gear teeth 144, ring 146, pressure indicator 150, indicator mark 152, gear teeth 154, ring 156, center axis 170, location 180 of device 100, respectively. Additionally, first side 631, second side 633, non-circular section 639, first side 641, second side 643, non-circular section 649, first side 651, second side 653, non-circular section 659, label 682, indicator spacer 661, protrusion 663, gap 619, surface 611, surface 613, surface 615, surface 623, hole 624, surface 625, hole 626, surface 627, hole 628, annular channel 638, annular channel 648, annular channel 658, surface 665, and surface 667 of device 600 function the same as first side 531, second side 533, non-circular section 539, first side 541, second side 543, non-circular section 549, first side 551, second side 553, non-circular section 559, label 582, indicator spacer 561, protrusion 563, gap 519, surface 511, surface 513, surface 515, surface 523, hole 524, surface 525, hole 526, surface 527, hole 528, annular channel 538, annular channel 548, annular channel 558, surface 565, and surface 567 of device 500, respectively. In some aspects, front bezel 612 and back bezel 620 can be in any color.

Figures 18, 19:
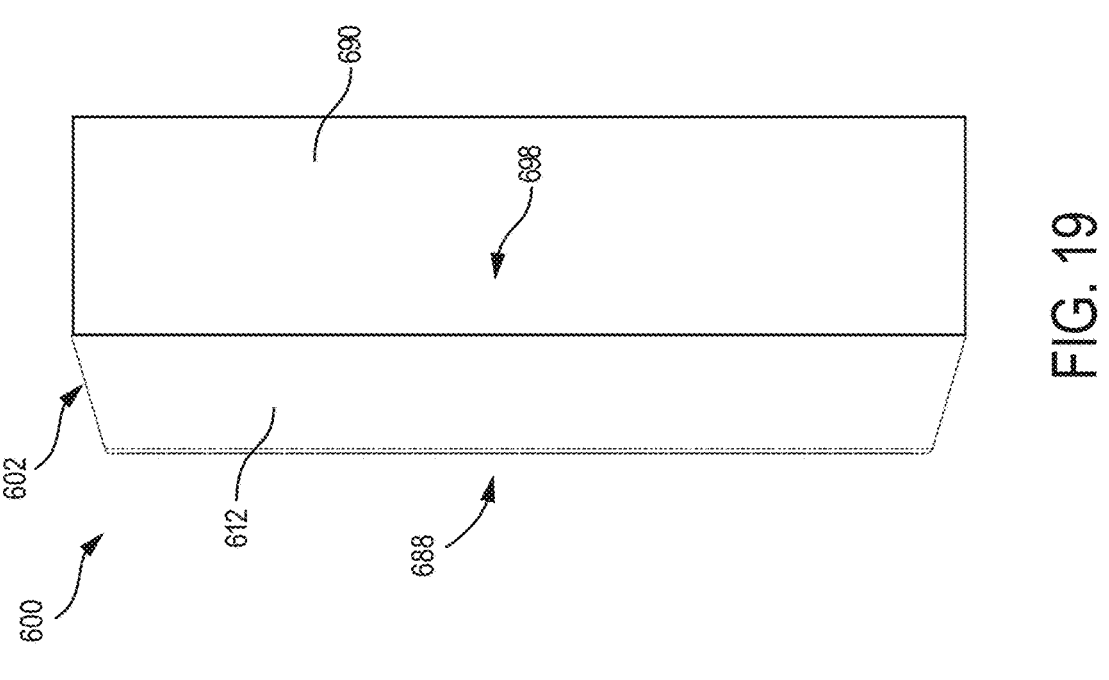
FIG. 18 is a front view of a device attachable to a pressure gauge, according to at least one aspect of the present disclosure.
FIG. 19 is a side view of the device of FIG. 18 attached to a pressure gauge, according to at least one aspect of the present disclosure.
Figure 20:
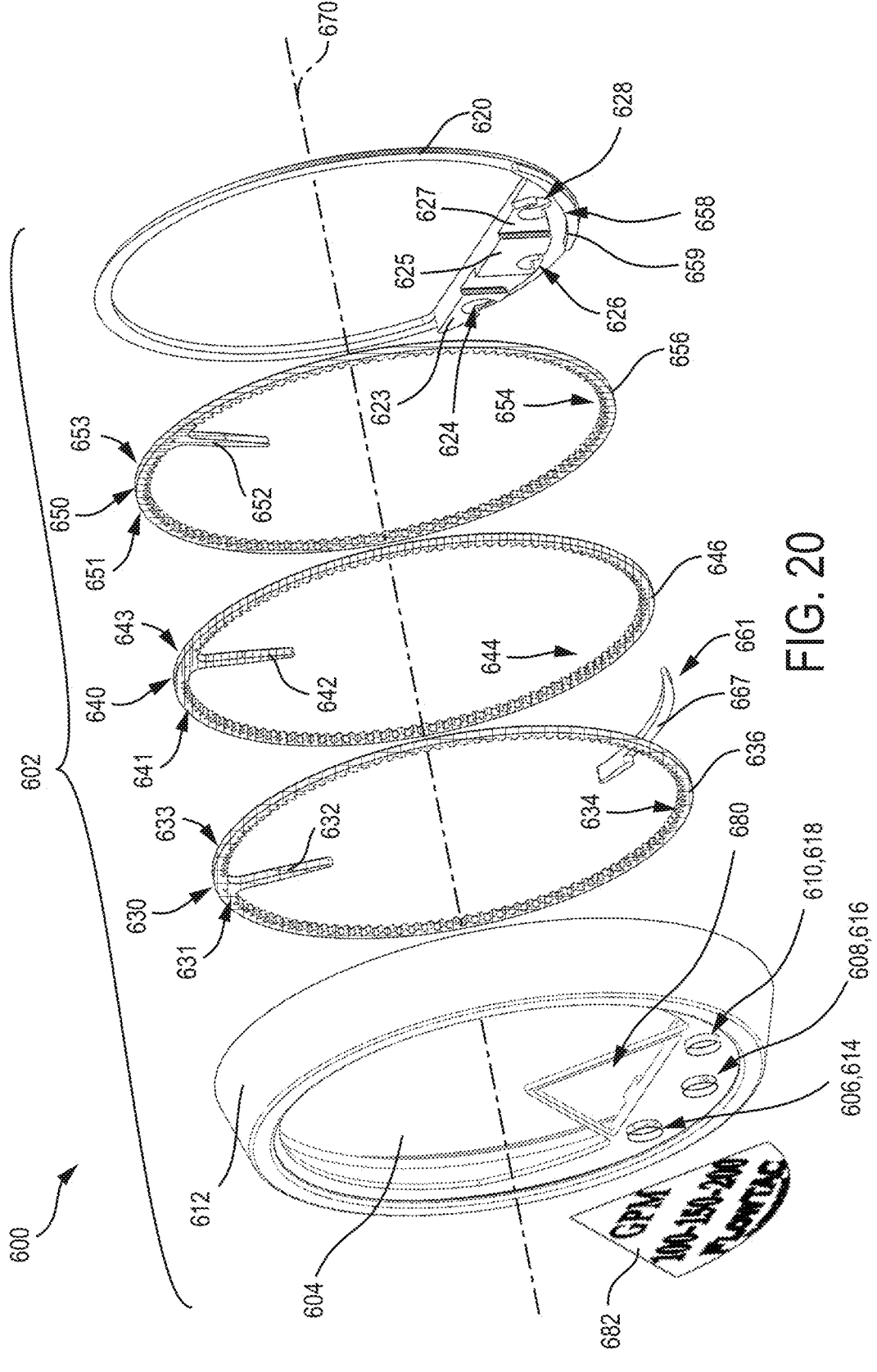
FIG. 20 is an exploded view of the device of FIG. 18, according to at least one aspect of the present disclosure.
Figures 21, 22:
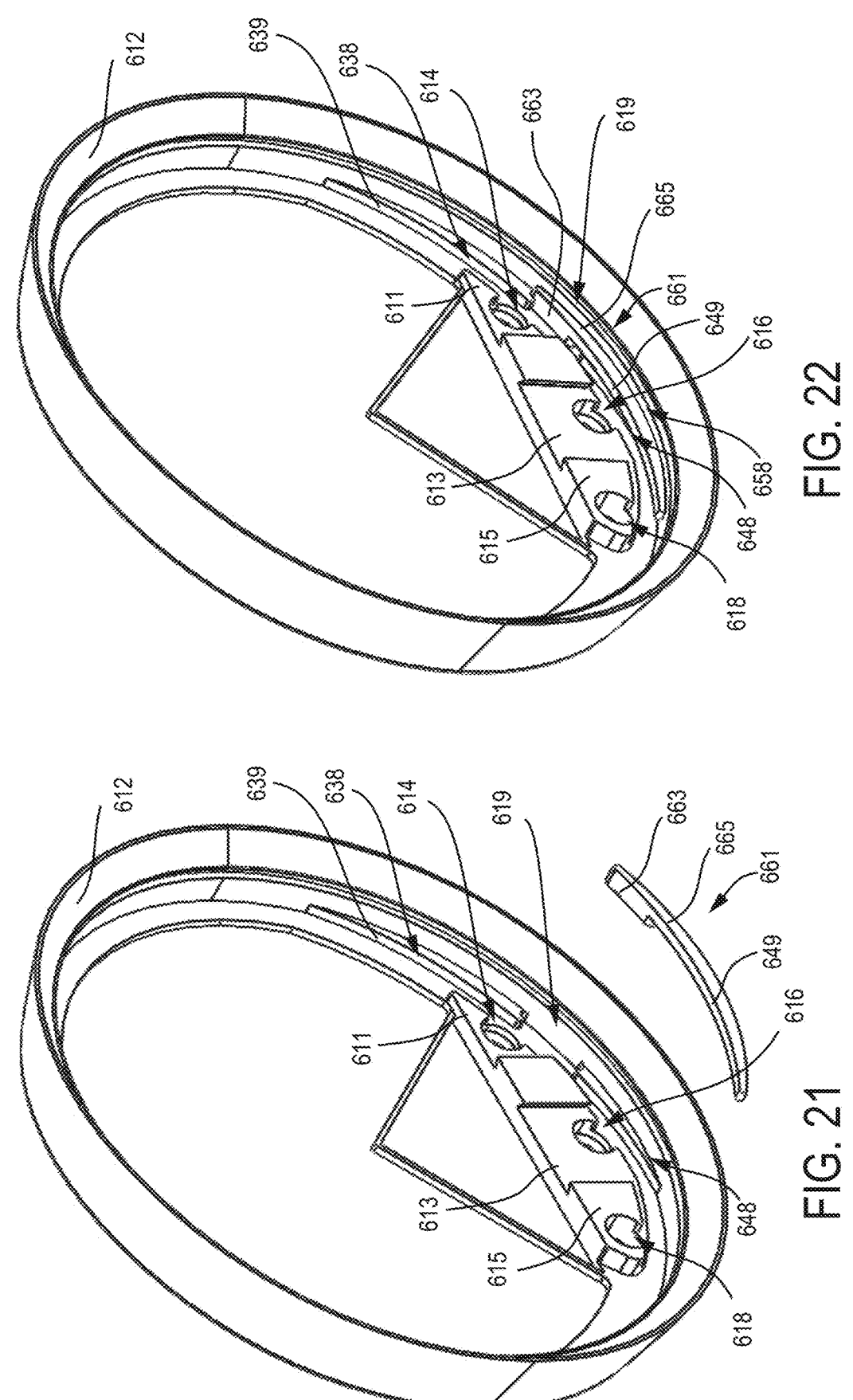
FIG. 21 is a perspective view of the device of FIG. 18 and an indicator spacer, according to at least one aspect of the present disclosure.
FIG. 22 is a perspective view of the device of FIG. 18 with the indicator spacer installed, according to at least one aspect of the present disclosure.

Referring to FIG. 19, the device 600 is attached to the pressure gauge 690 at the back side 698 of the device 600. The device 600 can mount to a surface mount style gauge with a rasied edge. In at least one aspect, the mounting is accomplished by fitting device 600 over the raised edge of the gauge and attaching the device 600 to the pressure gauge 690. In at least one aspect, double sided mounting tape is used to attach the device 600 to the pressure gauge 690. A user looks through the front side 688 of the device 600 to see the values on the pressure gauge 690. The user can then use a key 160 (FIG. 2, 2A) to rotate pressure indicator 630, 640, or 650 into alignment with a specific pressure on the pressure gauge 690.

Various aspects of the subject matter described herein are set out in the following numbered examples.

Example 1—A device, comprising a housing attachable to a pressure gauge, and a pressure indicator manually pivotable within the housing to a set position. The housing is configured to enclose and retain the pressure indicator in the set position.

Example 2—The device of Example 1, wherein the pressure gauge comprises a pressure gauge for a firetruck discharge.

Example 3—The device of Examples 1 or 2, wherein the housing comprises a transparent front cover covering the pressure indicator.

Example 4—The device of Examples 1, 2, or 3, further comprising an adjuster drivingly coupled to the pressure indicator, and a key configured to mechanically engage the adjuster to manually pivot the pressure indicator within the housing to the set position.

Example 5—The device of Example 4, wherein the key extends through the housing to engage the adjuster, and wherein the key is removed to disengage the key and the adjuster.

Example 6—The device of Examples 1, 2, 3, 4, or 5, further comprising a lock configured to hold the pressure indicator in the set position.

Example 7—The device of Examples 1, 2, 3, 4, 5, or 6, wherein the pressure indicator marks a range of pressures on the pressure gauge.

Example 8—The device of Examples 1, 2, 3, 4, 5, 6, or 7, wherein the pressure indicator comprises a first pressure indicator manually pivotable within the housing to a first set position, and wherein the device further comprises a second pressure indicator manually pivotable within the housing to a second set position.

Example 9—The device of Example 8, further comprising: a first adjuster drivingly coupled to the first pressure indicator, a second adjuster drivingly coupled to the second pressure indicator, and a key. The key is configured to drivingly mate with the first adjuster to manually pivot the first pressure indicator within the housing to the first set position, and drivingly mate with the second adjuster to manually pivot the second pressure indicator within the housing to the second set position.

Example 10—The device of Example 9, wherein the key extends through the housing in a first location to engage the first adjuster, and wherein the key extends through the housing in a second location to engage the second adjuster.

Example 11—A system for indicating a pressure on a pressure gauge, the system comprising a housing releasably attachable to the pressure gauge, wherein the housing comprises a transparent front cover, and a pressure indicator manually pivotable within the housing to a set position, wherein the housing is configured to enclose and retain the pressure indicator in the set position. The system further comprises an adjuster drivingly coupled to the pressure indicator, and a tool configured to selectively mate with the adjuster to manually pivot the pressure indicator within the housing to the set position.

Example 12—The system of Example 11, wherein the pressure gauge comprises a pressure gauge for a firetruck discharge.

Example 13—The system of Examples 11 or 12, wherein the tool is inserted through the housing to mate with the adjuster.

Example 14—The system of Examples 11, 12, or 13, further comprising a lock configured to hold the pressure indicator in the set position.

Example 15—The system of Examples 11, 12, 13, or 14, wherein the pressure indicator marks a range of pressures on the pressure gauge.

Example 16—The system of Example 11, wherein the adjuster comprises a first adjuster, wherein the set position comprises a first set position, and wherein the pressure indicator comprises a first pressure indicator manually pivotable inside of the housing to the first set position. The system further comprises a second pressure indicator manually pivotable inside of the housing to a second set position, and a second adjuster mechanically coupled to the second pressure indicator. The second pressure indicator is offset laterally from the first pressure indicator. The tool is configured to selectively drivingly mate with the first adjuster to manually pivot the first pressure indicator within the housing to the first set position, and selectively drivingly mate with the second adjuster to manually pivot the second pressure indicator within the housing to the second set position.

Example 17—The system of Example 16, wherein the tool is configured to be inserted through a first opening in the housing to mate with the first adjuster and is configured to be inserted through a second opening in the housing to mate with the second adjuster.

Example 18—A device, comprising a housing attachable to a fire truck pressure gauge, wherein the housing comprises a transparent front cover. The device further comprises a first pressure indicator manually pivotable within the housing to a first position, and a second pressure indicator manually pivotable inside of the housing to a second position. The second pressure indicator is offset laterally from the first pressure indicator. The housing is configured to enclose and retain the first pressure indicator in the first position and the second pressure indicator in the second position. The device further comprises a first adjuster drivingly coupled to the first pressure indicator, a second adjuster drivingly coupled to the second pressure indicator; a lock configured to hold the first pressure indicator in the first position and the second pressure indicator in the second position, and an implement configured to selectively overcome the lock to pivot the first pressure indicator within the housing to a first set position and to pivot the second pressure indicator within the housing to a second set position.

Example 19—The device of Example 18, wherein the implement extends through the housing in a first location to engage the first adjuster and wherein the implement extends through the housing in a second location to engage the second adjuster.

Example 20—The device of Examples 18 or 19, wherein the housing is water resistant.

While several forms have been illustrated and described, it is not the intention of Applicant to restrict or limit the scope of the appended claims to such detail. Numerous modifications, variations, changes, substitutions, combinations, and equivalents to those forms may be implemented and will occur to those skilled in the art without departing from the scope of the present disclosure. Moreover, the structure of each element associated with the described forms can be alternatively described as a means for providing the function performed by the element. Also, where materials are disclosed for certain components, other materials may be used. It is therefore to be understood that the foregoing description and the appended claims are intended to cover all such modifications, combinations, and variations as falling within the scope of the disclosed forms. The appended claims are intended to cover all such modifications, variations, changes, substitutions, modifications, and equivalents.

Those skilled in the art will recognize that, in general, terms used herein, and especially in the appended claims (e.g., bodies of the appended claims) are generally intended as "open" terms (e.g., the term "including" should be interpreted as "including but not limited to," the term "having" should be interpreted as "having at least," the term "includes" should be interpreted as "includes but is not limited to," etc.). It will be further understood by those within the art that if a specific number of an introduced claim recitation is intended, such an intent will be explicitly recited in the claim, and in the absence of such recitation no such intent is present. For example, as an aid to understanding, the following appended claims may contain usage of the introductory phrases "at least one" and "one or more" to introduce claim recitations. However, the use of such phrases should not be construed to imply that the introduction of a claim recitation by the indefinite articles "a" or "an" limits any particular claim containing such introduced claim recitation to claims containing only one such recitation, even when the same claim includes the introductory phrases "one or more" or "at least one" and indefinite articles such as "a" or "an" (e.g., "a" and/or "an" should typically be interpreted to mean "at least one" or "one or more"); the same holds true for the use of definite articles used to introduce claim recitations.

In addition, even if a specific number of an introduced claim recitation is explicitly recited, those skilled in the art will recognize that such recitation should typically be interpreted to mean at least the recited number (e.g., the bare recitation of "two recitations," without other modifiers, typically means at least two recitations, or two or more recitations). Furthermore, in those instances where a convention analogous to "at least one of A, B, and C, etc." is used, in general such a construction is intended in the sense one having skill in the art would understand the convention (e.g., "a system having at least one of A, B, and C" would include but not be limited to systems that have A alone, B alone, C alone, A and B together, A and C together, B and C together, and/or A, B, and C together, etc.). In those instances where a convention analogous to "at least one of A, B, or C, etc." is used, in general such a construction is intended in the sense one having skill in the art would understand the convention (e.g., "a system having at least one of A, B, or C" would include but not be limited to systems that have A alone, B alone, C alone, A and B together, A and C together, B and C together, and/or A, B, and C together, etc.). It will be further understood by those within the art that typically a disjunctive word and/or phrase presenting two or more alternative terms, whether in the description, claims, or drawings, should be understood to contemplate the possibilities of including one of the terms, either of the terms, or both terms unless context dictates otherwise. For example, the phrase "A or B" will be typically understood to include the possibilities of "A" or "B" or "A and B."

With respect to the appended claims, those skilled in the art will appreciate that recited operations therein may generally be performed in any order. Also, although various operational flow diagrams are presented in a sequence(s), it should be understood that the various operations may be performed in other orders than those which are illustrated, or may be performed concurrently. Examples of such alternate orderings may include overlapping, interleaved, interrupted, reordered, incremental, preparatory, supplemental, simultaneous, reverse, or other variant orderings, unless context dictates otherwise. Furthermore, terms like "responsive to," "related to," or other past-tense adjectives are generally not intended to exclude such variants, unless context dictates otherwise.

It is worthy to note that any reference to "one aspect," "an aspect," "an exemplification," "one exemplification," and the like means that a particular feature, structure, or characteristic described in connection with the aspect is included in at least one aspect. Thus, appearances of the phrases "in one aspect," "in an aspect," "in an exemplification," and "in one exemplification" in various places throughout the specification are not necessarily all referring to the same aspect.

Furthermore, the particular features, structures or characteristics may be combined in any suitable manner in one or more aspects.

Any patent application, patent, non-patent publication, or other disclosure material referred to in this specification and/or listed in any Application Data Sheet is incorporated by reference herein, to the extent that the incorporated materials is not inconsistent herewith. As such, and to the extent necessary, the disclosure as explicitly set forth herein supersedes any conflicting material incorporated herein by reference. Any material, or portion thereof, that is said to be incorporated by reference herein, but which conflicts with existing definitions, statements, or other disclosure material set forth herein will only be incorporated to the extent that no conflict arises between that incorporated material and the existing disclosure material.

In summary, numerous benefits have been described which result from employing the concepts described herein. The foregoing description of the one or more forms has been presented for purposes of illustration and description. It is not intended to be exhaustive or limiting to the precise form disclosed. Modifications or variations are possible in light of the above teachings. The one or more forms were chosen and described in order to illustrate principles and practical application to thereby enable one of ordinary skill in the art to utilize the various forms and with various modifications as are suited to the particular use contemplated. It is intended that the claims submitted herewith define the overall scope.

The invention claimed is:

1. A device, comprising:
   a housing attachable to a pressure gauge; and
   a pressure indicator manually pivotable within the housing to a set position, wherein the housing is configured to enclose and retain the pressure indicator in the set position;
   wherein an access aperture is defined in the housing, and wherein the access aperture is positioned and dimensioned to provide access to within the housing to adjust the pressure indicator.

2. The device of claim 1, further comprising the pressure gauge, wherein the pressure gauge comprises a firetruck discharge pressure gauge.

3. The device of claim 1, wherein the housing comprises a transparent front cover covering the pressure indicator, and wherein the access aperture comprises a through hole in the transparent front cover.

4. The device of claim 1, further comprising:
   an adjuster drivingly coupled to the pressure indicator; and
   a key configured to mechanically engage the adjuster to manually pivot the pressure indicator within the housing to the set position.

5. The device of claim 4, wherein the key extends through the access aperture to engage the adjuster, and wherein the key is removed to disengage the key and the adjuster.

6. The device of claim 1, further comprising a lock configured to hold the pressure indicator in the set position.

7. The device of claim 1, wherein the pressure indicator marks a range of pressures on the pressure gauge.

8. A device, comprising:
   a housing attachable to a pressure gauge; and
   a first pressure indicator manually pivotable within the housing to a first set position; and
   a second pressure indicator manually pivotable within the housing to a second set position, wherein the housing is configured to enclose and retain the first pressure indicator in the first set position and the second pressure indicator in the second set position.

9. The device of claim 8, further comprising:
a first adjuster drivingly coupled to the first pressure indicator;
a second adjuster drivingly coupled to the second pressure indicator; and
a key configured to:
    drivingly mate with the first adjuster to manually pivot the first pressure indicator within the housing to the first set position; and
    drivingly mate with the second adjuster to manually pivot the second pressure indicator within the housing to the second set position.

10. The device of claim 9, wherein the key extends through a first access aperture in the housing to engage the first adjuster, and wherein the key extends through a second access aperture in the housing to engage the second adjuster.

11. A system for indicating a pressure on a pressure gauge, the system comprising:
a housing releasably attachable to the pressure gauge, wherein the housing comprises a transparent front cover, wherein a through hole is defined in the transparent front cover;
a pressure indicator manually pivotable within the housing to a set position, wherein the housing is configured to enclose and retain the pressure indicator in the set position;
an adjuster drivingly coupled to the pressure indicator; and
a tool positionable through the through hole to selectively mate with the adjuster to manually pivot the pressure indicator within the housing to the set position.

12. The system of claim 11, further comprising the pressure gauge, wherein the pressure gauge comprises a firetruck discharge pressure gauge.

13. The system of claim 11, further comprising a lock configured to hold the pressure indicator in the set position.

14. The system of claim 11, wherein the pressure indicator marks a range of pressures on the pressure gauge.

15. The system of claim 11, wherein the adjuster comprises a first adjuster, wherein the set position comprises a first set position, wherein the pressure indicator comprises a first pressure indicator manually pivotable inside of the housing to the first set position, wherein the system further comprises:
a second pressure indicator manually pivotable inside of the housing to a second set position, wherein the second pressure indicator is offset laterally from the first pressure indicator; and a second adjuster mechanically coupled to the second pressure indicator; and
wherein the tool is configured to:
    selectively drivingly mate with the first adjuster to manually pivot the first pressure indicator within the housing to the first set position; and
    selectively drivingly mate with the second adjuster to manually pivot the second pressure indicator within the housing to the second set position.

16. The system of claim 15, wherein the through hole comprises a first opening, wherein the tool is configured to be inserted through the first opening in the housing to mate with the first adjuster and is further configured to be inserted through a second opening in the housing to mate with the second adjuster.

17. A device, comprising:
a housing attachable to a fire truck pressure gauge, wherein the housing comprises a transparent front cover;
a first pressure indicator manually pivotable within the housing to a first position;
a second pressure indicator manually pivotable inside of the housing to a second position, wherein the second pressure indicator is offset laterally from the first pressure indicator, and wherein the housing is configured to enclose and retain the first pressure indicator in the first position and the second pressure indicator in the second position;
a first adjuster drivingly coupled to the first pressure indicator;
a second adjuster drivingly coupled to the second pressure indicator;
a lock configured to hold the first pressure indicator in the first position and the second pressure indicator in the second position; and
an implement configured to selectively overcome the lock to pivot the first pressure indicator within the housing to a first set position and to pivot the second pressure indicator within the housing to a second set position.

18. The device of claim 17, wherein the implement extends through the housing in a first location to engage the first adjuster and wherein the implement extends through the housing in a second location to engage the second adjuster.

19. The device of claim 17, wherein the housing is water resistant.

* * * * *